(12) United States Patent
Cosson et al.

(10) Patent No.: US 12,716,763 B2
(45) Date of Patent: Aug. 25, 2026

(54) SENSOR DEVICE FOR MEASURING THE LEVEL OF MATERIAL CONTAINED IN A CONTAINER

(71) Applicant: LESAFFRE ET COMPAGNIE, Paris (FR)

(72) Inventors: Thierry Cosson, Mons en Baroeul (FR); Rudy Houque, Saint-Andre-Lez-Lille (FR); Florent Picavet, Marcq en Baroeul (FR); Peter Quiguer, Vendeville (FR)

(73) Assignee: LESAFFRE ET COMPAGNIE, Paris (FR)

( * ) Notice: Subject to any disclaimer, the term of this patent is extended or adjusted under 35 U.S.C. 154(b) by 1056 days.

(21) Appl. No.: 17/794,883

(22) PCT Filed: Jan. 18, 2021

(86) PCT No.: PCT/FR2021/050088
§ 371 (c)(1),
(2) Date: Dec. 7, 2022

(87) PCT Pub. No.: WO2021/148749
PCT Pub. Date: Jul. 29, 2021

(65) Prior Publication Data

US 2025/0271292 A1 Aug. 28, 2025

(30) Foreign Application Priority Data

Jan. 24, 2020 (FR) ...................................... 2000705

(51) Int. Cl.
*G06K 19/00* (2006.01)
*G01D 5/14* (2006.01)
(Continued)

(52) U.S. Cl.
CPC ........... *G01F 23/292* (2013.01); *G01D 5/145* (2013.01); *G06K 19/0723* (2013.01)

(58) Field of Classification Search
CPC .. G01F 23/292; G01F 23/2928; G01F 23/296; G01F 23/284; G01D 5/145;
(Continued)

(56) References Cited

U.S. PATENT DOCUMENTS 6,040,897 A * 3/2000 Clifford .............. G01F 23/2928 73/290 R
6,259,516 B1 7/2001 Carter et al.
(Continued)

FOREIGN PATENT DOCUMENTS

CN 1348091 A 5/2002
CN 1361860 A 7/2002
(Continued)

OTHER PUBLICATIONS

Office Action, issued in Chinese Patent Application No. 202180020646.4 dated Jan. 26, 2025.
(Continued)

*Primary Examiner* — Frank F Huang
(74) *Attorney, Agent, or Firm* — NIXON & VANDERHYE, PC

(57) ABSTRACT

A sensor device for measuring the level of material in a container, including: a shell, and at least one contactless level sensor housed inside the shell, the shell including a measurement window enabling the passage of a detection signal emitted by the sensor and the passage of a reflected detection signal, after reflection against the free surface of the material inside the container. The sensor device further includes a fastener secured to the shell, enabling the removable fastening of the sensor device outside the container, on a connector secured to the container, with the measurement
(Continued)

window of the shell positioned opposite a corresponding opening formed in the container.

22 Claims, 11 Drawing Sheets

(51) Int. Cl.
*G01F 23/292* (2006.01)
*G06K 19/07* (2006.01)

(58) Field of Classification Search
CPC ... G06K 19/0723; G01S 7/4813; G01S 17/08; G01S 7/027; G01S 17/88
See application file for complete search history.

(56) References Cited

U.S. PATENT DOCUMENTS

| | | | | |
|---|---|---|---|---|
| 6,339,468 | B1 | 1/2002 | Clifford et al. | |
| 6,736,006 | B2 * | 5/2004 | Arias | G01F 23/242 73/304 R |
| 6,782,122 | B1 | 8/2004 | Kline et al. | |
| 6,938,478 | B2 * | 9/2005 | Arias | G01F 23/24 73/304 R |
| 11,274,929 | B1 * | 3/2022 | Afrouzi | G06T 7/30 |
| 11,298,835 | B2 * | 4/2022 | Kim | B25J 19/026 |
| 11,327,483 | B2 * | 5/2022 | al-Mohssen | A47L 11/4011 |
| 11,327,503 | B2 * | 5/2022 | Deyle | G06V 20/58 |
| 11,331,805 | B2 * | 5/2022 | Cappello | A63F 13/90 |
| 11,579,252 | B2 * | 2/2023 | Robertson, Jr. | F28F 3/025 |
| 2002/0008659 | A1 | 1/2002 | Fehrenbach et al. | |
| 2004/0005496 | A1 | 1/2004 | Kelley | |
| 2004/0025569 | A1 | 2/2004 | Damm et al. | |
| 2009/0066966 | A1 | 3/2009 | Baath | |
| 2009/0161105 | A1 * | 6/2009 | Chen | G01F 23/284 356/369 |
| 2009/0229359 | A1 | 9/2009 | Reimelt et al. | |
| 2009/0302867 | A1 | 12/2009 | Schroth et al. | |
| 2010/0101317 | A1 | 4/2010 | Ashrafzadeh et al. | |
| 2011/0247424 | A1 | 10/2011 | Mayr et al. | |
| 2012/0133759 | A1 | 5/2012 | Giordano et al. | |
| 2016/0047684 | A1 | 2/2016 | Gorenflo et al. | |
| 2016/0180690 | A1 | 6/2016 | Bentkovski | |
| 2016/0223460 | A1 | 8/2016 | Schenkl et al. | |
| 2016/0292990 | A1 | 10/2016 | Pesz et al. | |
| 2017/0225336 | A1 * | 8/2017 | Deyle | B25J 11/008 |
| 2018/0052033 | A1 | 2/2018 | Pesz et al. | |
| 2019/0266414 | A1 * | 8/2019 | Stawiszynski | G06Q 50/26 |
| 2021/0208949 | A1 * | 7/2021 | Bijwe | G06F 9/5005 |
| 2021/0333406 | A1 * | 10/2021 | Lee | G01S 7/4817 |

FOREIGN PATENT DOCUMENTS

| | | | |
|---|---|---|---|
| CN | 1473264 | A | 2/2004 |
| CN | 101300464 | A | 11/2008 |
| CN | 102257514 | A | 11/2011 |
| CN | 102695945 | A | 9/2012 |
| CN | 107938763 | A | 4/2018 |
| CN | 208091535 | U | 11/2018 |
| DE | 29 27 449 | | 1/1981 |
| DE | 4104177 | A1 | 8/1992 |
| DE | 102014223945 | A1 | 5/2016 |
| EP | 2593757 | A1 | 5/2013 |
| EP | 2982943 | A2 | 2/2016 |
| EP | 2 265 909 | | 6/2017 |
| EP | 3 598 081 | | 1/2020 |
| RU | 180003 | U1 | 5/2018 |
| RU | 2678760 | C2 | 1/2019 |
| SU | 443259 | A1 | 9/1974 |
| WO | 0233439 | A1 | 4/2002 |
| WO | 2010/003210 | | 1/2010 |
| WO | 2012007294 | A1 | 1/2012 |
| WO | 2018/219683 | | 12/2018 |

OTHER PUBLICATIONS

Office Action and Search Report, issued in Chinese Patent Application No. 202180020646.4 dated Aug. 20, 2025.

International Search Report for PCT/FR2021/050088, mailed Aug. 9, 2021, 11 pages (with translation).

Written Opinion of the ISA for PCT/FR2021/050088, mailed Aug. 9, 2021, 18 pages.

Office Action, issued in Russian Patent Application No. 2022122693 dated Jan. 18, 2021.

Office Action, issued in Chinese Patent Application No. 202180020646.4 dated Nov. 20, 2025.

Office Action, issued in Uruguayan Patent Application No. 39025 dated Feb. 9, 2026.

* cited by examiner

SENSOR DEVICE FOR MEASURING THE LEVEL OF MATERIAL CONTAINED IN A CONTAINER

This application is the U.S. national phase of International Application No. PCT/FR2021/050088 filed Jan. 18, 2021 which designated the U.S. and claims priority to FR 2000705 filed Jan. 24, 2020, the entire contents of each of which are hereby incorporated by reference.

BACKGROUND OF THE INVENTION

Field of the Invention

The present invention relates to a sensor device for measuring the level of material in a container, and in particular of unstable material whose characteristics change over time, such as yeast or leaven, in particular liquid yeast or leaven.

The invention also relates to a set comprising such a sensor device and a means for connection to a container.

The invention also relates to a system comprising such a set and a container.

The invention also relates to a method for cleaning the inside of the outer enclosure of a container of such a system.

Finally, the invention relates to a method for remote monitoring of information relating to a container, as well as a processing circuit configured to execute such a method and a processor-readable memory unit comprising instructions which, when they are executed by the processor, lead the latter to implement such a method.

Description of the Related Art

Containers containing material, and in particular unstable material, whose characteristics change over time, and in particular yeast or leaven, in particular liquid yeast or leaven, are generally filled in a production factory of said material then transported up to the location where said material is used, for example to a baker in the case of yeast or leaven.

In order to be able to use the container again, the latter is sent back, once emptied of the material, to the producer of said material to be cleaned and filled again with material.

Thus, a producer of said material may end up with a very large fleet of containers, distributed at various locations over a quite large geographical area, for example in several countries, or even on several different continents, which complicates the management of the logistics of such a container park.

In order to incite users to return the containers to the producer, a deposit system may be set up which financially incites users to return the containers once empty, but this method is not fully satisfactory, many users keeping the container once empty, despite the financial loss they suffer in return.

In order to facilitate the logistics of the different containers of its fleet, and to be able to monitor the use of the containers containing the produced material, and in particular when said fleet includes a large number of containers distributed in various locations over a large geographical area (for example over one or more continents), it could be advantageous for the producer to be able to benefit from real-time information on each of the containers located with the users, and in particular on the level of material inside the container with the user or its accurate geographical position.

Thus, it is for example possible to automatically initiate an action to send back the container to the production factory as soon as the level of material inside the container drops below a determined threshold, also using the geographical position of the container to optimally organise the return thereof, possibly combined with the delivery of a new container containing said material.

Hence, it is desirable for a producer of a material intended to be conveyed and used in a container by an end user to be able to benefit from a device allowing the real-time determination of information relating to the container, in order to be able to transmit this information to the producer in order to facilitate the logistics of said container.

For example, a sensor device is known for measuring the level of material in a container comprising a sealed enclosure receiving said material, marketed by the company Nanolike©, and described in part in the patent application WO 2018219683 A1.

Such a sensor device is intended to determine the level of material in a container from the measurement of the pressure exerted by the container on a pressure sensor. To this end, the pressure sensor of the sensor device is intended to be positioned between a lower wall of the enclosure of the container and a support, such as a pallet, supporting said lower wall of the enclosure, the sensor being interposed between the lower wall of the enclosure and the support. Thus, the pressure measured by the sensor substantially corresponds to the weight of the container, from which it is possible to deduce the volume of material inside its outer enclosure and therefore the level of material, in order to transmit information relating to this material level.

Such a sensor device has several drawbacks.

First of all, its positioning between the lower wall of the enclosure of the container and the support requires the systematic presence of a support associated to the container. Yet, for some applications, for example when the container is intended to be stored while being suspended, such a support is absent and the positioning of such a sensor therefore turns out to be impossible.

In addition, should its installation on an existing container be considered, the position of the sensor requires proceeding with a complete detachment between the enclosure of the container and the support, prior to its set-up, which significantly increases the time needed for installation thereof and therefore makes it unsuitable to be installed on an existing container, and all the more on an entire existing fleet of containers.

Similarly, in the context of a maintenance operation on the sensor device or on the container, access to said sensor device or its detachment off the container enclosure, also requires proceeding with the complete detachment between the container enclosure and the support beforehand, which complicates and substantially increases the time required for maintenance operations.

Also, the pressure sensor of the sensor device is arranged in a location that is not easily accessible, which might complicate maintenance thereof, but also alter its ability to transmit data, for example by a cellular network, its position preventing the passage of radio waves, which might be blocked by some elements of the container.

Thus, to proceed with cleaning of the enclosure of the container, the sensor device is generally left secured to the enclosure and to the support. Thus, it finds itself subjected to severe conditions (pressure, temperature, pH) during said container cleaning operations, which might affect its service life.

SUMMARY OF THE INVENTION

Hence, the objective of the invention is to overcome the drawbacks of the sensor devices of the prior art by providing a sensor device to facilitate the logistics of a container, or of a fleet comprising a plurality of containers, and allowing in particular measuring the level of material in a container, and able to be installed on a wide variety of containers, in terms of shape and dimensions.

Another object of the present invention is to provide such a sensor device able to be easily and quickly installed on a pre-existing container.

Another object of the present invention is to provide such a sensor device whose maintenance is facilitated, and also facilitating the maintenance of the container on which it is installed.

Another object of the present invention is to provide such a sensor device able to easily transmit data, and in particular by radio waves.

Another object of the present invention is to provide such a sensor device with a long energy autonomy duration, in particular of several years.

Another object of the present invention is to provide such a sensor device with a simple design and with a reduced cost price.

A sensor device for measuring the level of material in a container is provided, the container comprising a sealed enclosure configured to contain material defining a free surface inside the enclosure, the sensor device comprising:

a shell, at least one contactless level sensor, comprising an emitter configured to emit a detection signal, and a receiver configured to receive a reflected detection signal, the reflected detection signal comprising the detection signal after reflection, said level sensor being housed inside the shell.

According to the invention, the shell includes a measurement window enabling the passage of the detection signal emitted by said emitter from the inside of the shell to the inside of the enclosure of the container and the passage of the reflected detection signal, after reflection against the free surface of the material inside the enclosure of the container, from the inside of the enclosure of the container towards said receiver inside the shell.

According to the invention, the sensor device further comprises a fastening means secured to the shell, configured so as to enable the removable fastening of the sensor device, outside the enclosure of the container, on a connecting means secured to a wall of the enclosure of the container, with the measurement window of the shell positioned opposite a corresponding opening formed in the wall of the enclosure of the container.

According to the invention, the level sensor is configured to emit a measurement signal relating to the level of the material inside the enclosure of the container as a function of the reflected detection signal received by the receiver.

According to optional features of the invention, considered alone or in combination:

the fastening means comprises a thread surrounding said measurement window, the thread being configured to cooperate by screwing/unscrewing with a tapping of the connecting means, the tapping being configured to surround the opening of the container;

said detection signal emitted by the emitter is an electromagnetic, optical or ultrasonic signal;

the device further comprises a geolocation means, configured to emit a signal allowing determining the geographical position of the sensor device;

said shell comprises at least one thermoplastic material, for example polypropylene;

the device comprises a user interface connected to said level sensor, the user interface comprising a display configured so as to display information relating to the level of material inside the enclosure of the container dependent on the measurement signal emitted by said level sensor;

the display comprises a plurality of light-emitting diodes associated with a plurality of markings and the user interface comprises at least one actuation button, connected to the display, the actuation button being configured to trigger a measurement of the level of the material inside the enclosure of the container by the level sensor and the display of information relating to the level of material inside the enclosure of the container;

the device further comprises a data transmitter, configured so as to send data from the level sensor towards a remote server, the data comprising data relating to the level of material inside the enclosure of the container established from the measurement signal emitted by the level sensor;

the data transmitter is configured to transmit data with a remote server via a low-speed cellular network, over a frequency band comprised between 800 MHz and 1,000 MHz;

the device further comprises a temperature sensor, configured so as to measure the temperature surrounding the device.

The invention also relates to a set comprising:

a sensor device according to the invention, a connecting means, adapted to be secured to a wall of the enclosure of a container.

According to the invention, the connecting means has a through hole intended to be positioned opposite and in line with an opening formed in said wall of the enclosure of the container.

According to the invention, the sensor device is configured to be removably fastened on the connecting means via its fastening means with the measurement window of its shell opposite and in line with the through hole of the connecting means and of the opening formed in the wall of the enclosure of the container, said through hole being configured to be crossed by the detection signal emitted by the emitter and by the reflected detection signal intended to be received by the receiver.

According to one embodiment:

the fastening means of the sensor device comprises a thread surrounding the measurement window of the shell of the sensor device, and the connecting means includes a tapping surrounding said through hole, the tapping being configured to surround the opening formed in the wall of the enclosure of the container, the tapping being configured to cooperate with said thread of the fastening means to ensure the removable fastening of the sensor device on said connecting means by screwing/unscrewing.

According to one embodiment, the connecting means includes a first stop wall and a second stop wall positioned opposite and substantially parallel to the first stop wall, and movable in translation relative to the first stop wall, the first stop wall and the second stop wall being configured to grasp the wall of the enclosure of the container in order to ensure fastening of the connecting means to the enclosure of the container.

The invention also relates to a system comprising:

a set according to the invention, a container including a sealed enclosure, the enclosure comprising a wall, the enclosure being able to contain material therein, an opening being formed in the wall of the enclosure, the opening being configured to connect the inside and the outside of the enclosure.

According to the invention, the connecting means is secured to the wall of the enclosure with its through hole opposite and in line with of the opening of the container.

According to the invention, the sensor device is removably fastened to the connecting means with its measurement window in line with the through hole of the connecting means and of the opening of the container, so that the emitter of the level sensor is able to emit the detection signal towards the inside of the enclosure of the container and that the receiver of the level sensor is able to receive said reflected detection signal, after reflection against the free surface of the material inside the enclosure of the container.

According to one embodiment, the opening is formed in an upper wall of the enclosure and the sensor device is fastened on an upper wall of the enclosure of the container.

According to one embodiment, the enclosure of the container contains unstable material, the unstable material having characteristics changing over time, and in particular yeast or leaven.

The invention also relates to a method for cleaning the enclosure of a container of a system according to the invention, comprising:

the detachment of the sensor device off the connecting means, the evacuation of said sensor device, the cleaning of the enclosure at a temperature higher than 60° C.

The invention also relates to a method for remote monitoring of information relating to a container comprising a sealed enclosure able to contain unstable material, the unstable material having characteristics changing over time, using a sensor device according to the invention, the method comprising:

the measurement of the level of material inside the enclosure of the container, the generation of data representative of the level of material inside the enclosure of the container, the transmission of the data representative of the level of material inside the enclosure of the container.

The invention also relates to a processing circuit configured to execute a method for monitoring information relating to a container according to the invention.

Finally, the invention relates to a processor-readable memory unit comprising instructions which, when they are executed by the processor, cause the latter to implement the method for monitoring information relating to a container according to the invention.

BRIEF DESCRIPTION OF THE DRAWINGS

Other features, details and advantages of the invention will appear upon reading the detailed description hereinafter, and upon analysing the appended drawings, wherein.

DESCRIPTION OF THE PREFERRED EMBODIMENTS

Figure 1A:
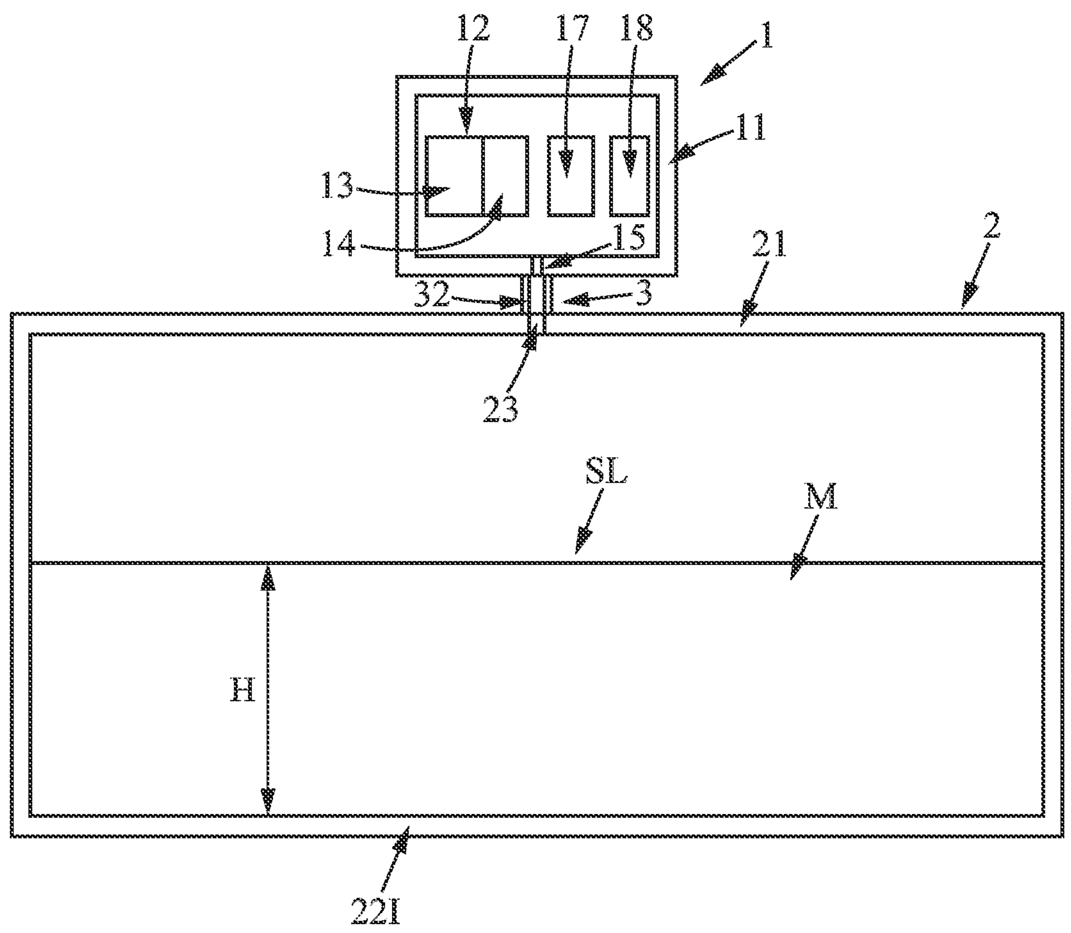
FIG. 1A shows a schematic sectional view of a system comprising a container, a connecting means and a sensor device according to an embodiment in accordance with the invention.

The drawings and the description hereinafter essentially contain certain elements. Hence, they could not only be used to better understand the present invention, but also contribute to the definition thereof, where necessary.

Throughout the present application, upper/lower and lateral, with regards to the position of some elements of the container device, of the connecting means or of the container, should be understood according to a substantially vertical direction of space.

The invention relates to a sensor device 1 for measuring the level of material M in a container 2, the container comprising a sealed enclosure 21 configured to contain material M defining a free surface SL inside the enclosure 21.

According to the invention, the sensor device 1 comprises:

a shell 11, at least one contactless level sensor 12, comprising an emitter 13 configured to emit a detection signal S13, and a receiver 14 configured to receive a reflected detection signal S14, the reflected detection signal S14 comprising the detection signal S13 after reflection, said level sensor 12 being housed inside the shell 11.

According to the invention, the shell 11 includes a measurement window 15 enabling the passage of the detection signal S13 emitted by said emitter 13 from the inside of the shell 13 towards the inside of the enclosure 21 of the container 2 and the passage of the reflected detection signal S14, after reflection against the free surface SL of the material M inside the enclosure 21 of the container 2, from the inside of the enclosure 21 of the container 2 towards said receiver 14 inside the shell 11.

According to the invention, the sensor device 1 further comprises a fastening means 16 secured to the shell 11, configured so as to enable the removable fastening of the sensor device 1, outside the enclosure 21 of the container 2, on a connecting means 3 secured to a wall 22 of the enclosure 21 of the container 2, with the measurement window 15 of the shell 11 positioned opposite a corresponding opening 23 formed in the wall 22 of the enclosure 21 of the container 2.

According to the invention, the level sensor 12 is configured to emit a measurement signal relating to the level of the material M inside the enclosure 21 of the container 2 as a function of the reflected detection signal S14 received by the receiver 14.

Throughout the present application, by "level of material M inside the enclosure 21 of the container 2", as shown in the embodiment of FIG. 1A, it should be understood the height H, according to a substantially vertical direction of the space, at which the free surface SL of the material M is located inside the enclosure 21 of the container 2 with respect to a reference lower wall 22I of the enclosure 21.

Figure 7A:
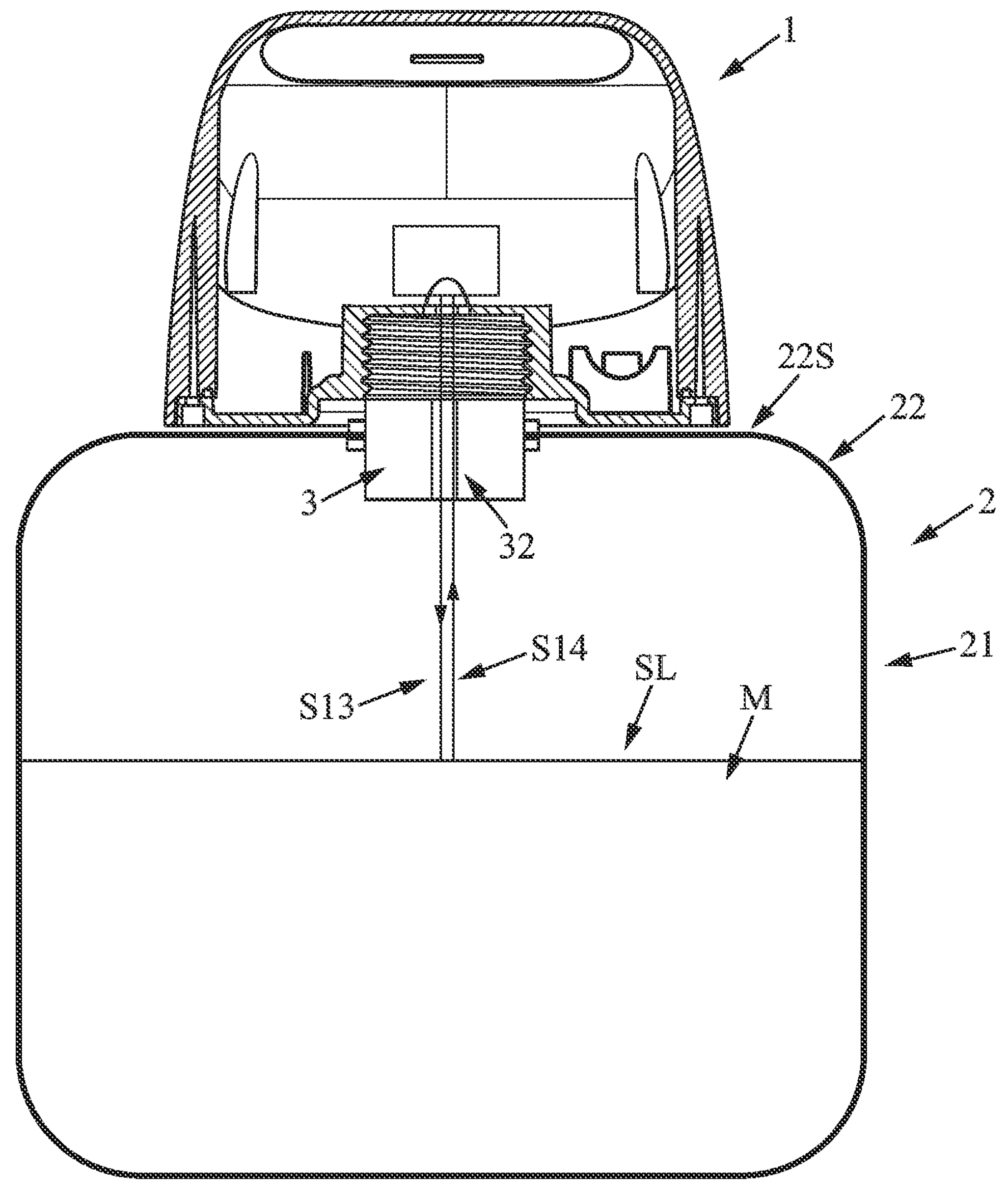
FIG. 7A shows a sectional view along the line IV-IV of FIG. 3 of the sensor device of FIG. 2 fastened to a wall of the enclosure of a container, represented entirely, via a connecting means, of a system according to an embodiment in accordance with the invention.

Also, as shown more particularly in the embodiment of FIG. 7A, in order to determine the level of material M inside the enclosure 21 of the container 2, the detection signal S13 emitted by the emitter 13 is intended to be reflected by the surface SL of the material M inside the enclosure 21 of the container 2, or else by a lower wall 22I of the enclosure 21, when the latter is empty, and form, at least partially, the reflected detection signal S14 received by the receiver.

Thus, the sensor device 1 according to the invention could be easily installed on various types of containers 2, whose enclosure 21 rests or not on a support, and in particular on a pre-existing container 2, which allows providing the containers 2 of a pre-existing fleet with said sensor device 1 easily and quickly, and unlike the sensor device marketed by the company Nanolike©, and described in part in the document WO 2018219683 A1.

The installation of the sensor device 1 on a container 2 turns out to be particularly simple and quick, in that all it needs is to simply secure the fastening means 16 to the connecting means 3, without having to dismount either one of the container elements 2 beforehand.

Hence, the sensor device 1 according to the invention could be simply and quickly installed on containers 2 having various geometries.

Also, the level sensor 12 is a contactless sensor and therefore should not be placed inside the enclosure 21 of the container so as to be in contact with the material M whose level is to be measured.

In addition, as shown more particularly in the embodiments of FIGS. 1 and 7, the sensor device 1 may advantageously be positioned on an upper wall 22S of the enclosure 21 of the container 2, and thus have easy access to carry out installation thereof, but also maintenance operations on said sensor device 1, or on the container 2, requiring the detachment of the sensor device 1 off the enclosure 21 of the container 2.

Also, the free surface SL of the material M inside the enclosure 21 of the container 2 is generally located at the upper portion of the latter, opposite said upper wall 22S of the enclosure 21. Hence, the level sensor 12 of the sensor device 1 is located the closest to the free surface SL of the material M, which facilitates the measurement of the level of material M inside the enclosure 21 of the container 2.

Advantageously, the fastening means 16 secured to the shell 11 may be intended to be fastened on a connecting means 3 formed on the wall 22 of the enclosure 21 of the container not specifically intended to this end, just like said opening 23. For example, the connecting means 3 and the opening 23 may belong to a system for balancing pressure between the outside and the inside of the enclosure 21 of the container 2.

The sensor device 1 could then be quickly and easily installed on an existing container 2, and does not require any particular structural modification of the container 2.

At the very least, the drilling of an opening 23 in a wall 22 of the enclosure 21 of the container 2 and the installation of a connecting means 3 secured to said wall 22 of the enclosure 2 of the container 2 could be carried out easily and quickly on different types of containers, and in particular containers 2 belonging to a pre-existing fleet of containers 2.

Advantageously, said measurement window 15 may be formed on a lower wall 11I of the shell 11, in particular intended to be located opposite the upper wall 22S, as shown in the embodiments of FIGS. 3 to 6.

As also shown in the embodiments of FIGS. 3 to 6, in order to facilitate access to the inside of the shell 11 and therefore to the level sensor 12, for example to perform a maintenance operation on said sensor 12, it may advantageously be provided for a shell 11 in two or more portions, for example an upper portion 11S and a lower portion 11I, advantageously fastened together by means of removable fastening means, such as fastening screws.

As shown in the embodiments of FIGS. 1, 4, 6 and 7, the measurement window 15 may consist of a through hole formed in one of the walls of the shell 11 of the container device 1, and in particular the lower portion 11I of the shell 11.

Advantageously, and in order to prevent the penetration of external elements at said measurement window 15, such as the material M contained in the enclosure 21 of the container 2, the measurement window 15 may also comprise a plugging wall, configured to close said measurement window 15, for example at one of its ends. For example, said plugging wall may be made of a transparent material, in order to enable the passage of the detection signal S13 and of the reflected detection signal S14.

The level sensor 12 and possibly the other electronic elements of the sensor device 1 may be supplied with electricity by an energy storage means such as a battery, advantageously housed inside said shell 11. The use of an energy storage means allows avoiding having to connect the sensor device 1 to the electrical network for operation thereof.

Advantageously, the electricity storage means may be intended to confer a significant operating autonomy on the level sensor 12, in particular several years, which allows avoiding having to frequently recharge or replace said electricity storage means.

In particular, the sensor device 1 may be intended to be fastened on a connecting means 3 having a through hole 32 intended to be positioned opposite and in line with an opening 23 formed in said wall 22 of the enclosure 21 of the container 2, said through hole 32 being configured to be crossed by the detection signal emitted S13 by the emitter 13 and by the reflected detection signal 14 intended to be received by the receiver 14.

The sensor device 1 could then be configured to be removably fastened on the connecting means 3 via its fastening means 16 with the measurement window 15 of its shell 11 opposite and in line with the through hole 32 of the connecting means 3 and the opening 23 formed in the wall 22 of the enclosure 21 of the container 2.

According to a particular example, the sensor device 1 is intended to be fastened on a container 2 whose enclosure 21 has a capacity larger than 300 litres.

According to one embodiment, the fastening means 16 comprises a thread T16 surrounding said measurement window 15, the thread T16 being configured to cooperate by screwing/unscrewing with a tapping 31 of the connecting means 3, the tapping 31 being configured to surround opening 23 of the container 2.

Such fastening by screwing between said fastening means 16 and said connecting means 3 allows obtaining a robust, sealed and easily and quickly mountable/dismountable fastening between said sensor device 1 and the connecting means 3, and therefore the container 2.

However, and without departing from the scope of the present invention, another robust, sealed and easily and quickly mountable/dismountable fastening system may be provided, such as a bayonet, or slide system, etc.

According to one embodiment, said detection signal S13 emitted by emitter 13 is an electromagnetic, optical or ultrasonic signal.

For example, the level sensor 12 may be a radar, lidar, infrared, laser, etc., sensor.

According to a particular example, a level sensor 12 using an optical detection signal S13 gives satisfactory results in terms of accuracy of the measurement of the level of the material M in the enclosure 21 of the container 2.

Also, a level sensor 12 using an optical detection signal S13 requires little electrical energy to operate, which turns out to be advantageous for the sensor device 1 according to the invention, which is intended to operate for a long period (several years) with an electric power supply via an electricity storage means (not represented), for example a battery, which generally cannot be recharged or replaced during this period.

According to one embodiment, the sensor device 1 further comprises geolocation means 17, configured to emit a signal allowing determining the geographical position of the sensor device 1.

Advantageously, such a geolocation means 17 allows determining the geographical position of the sensor device 1 and therefore of the container 2, when the sensor 1 is fastened to said container 2, which facilitates the logistics operations of said container 2.

For example, the geolocation means ay comprise a GPS plotter.

Alternatively or complementarily, in the case where said sensor device 1 is intended to transmit data via a mobile telecommunications network, the geolocation means 17 may use a geolocation method using said mobile telecommunications network, and in particular by triangulation. Even if the accuracy of this geolocation method is lower in comparison with the GPS technology, the latter requires low energy consumption, which turns out to be particularly advantageous for the sensor device 1 according to the invention, which is intended to operate for a long period (several months) with an electric power supply via an electricity storage means, for example a battery, which generally cannot be recharged or replaced during this period.

Advantageously, as shown in the embodiment of FIG. 1A, said geolocation means 17 may be housed inside the shell 11 of the sensor device 1, in order to be isolated and protected from the surrounding environment.

According to one embodiment, said shell 11 comprises at least one thermoplastic material, for example polypropylene.

The use of such a thermoplastic material allows having a shock-resistant shell 11 which is easy to manufacture. The shell 11, and in particular the upper portion 11S and the lower portion 11I, when the latter is made in several portions, could be easily made by molding, in particular by injection molding.

According to one embodiment, the sensor device 1 comprises a user interface 4 connected to said level sensor 12, the user interface 4 comprising a display 41 configured so as to display information relating to the level of material M inside the enclosure 21 of the container 2 dependent on the measurement signal emitted by said level sensor 12.

Thus, in addition to the transmission of information relating to the level of material M inside the enclosure 21 of the container 2, for example to the production factory of said material M, for the monitoring of the container 2, it is possible to display said information via said display 41 to a user located proximate to the sensor device 1 and therefore the container 2, the latter possibly being interested in knowing the level of material M in the container 2.

In order to facilitate reading of information for a user located proximate to the sensor device 1, said interface 4, and in particular said display 41 may be arranged, at least partially, on the shell 11 of said sensor device 1.

Figure 2:
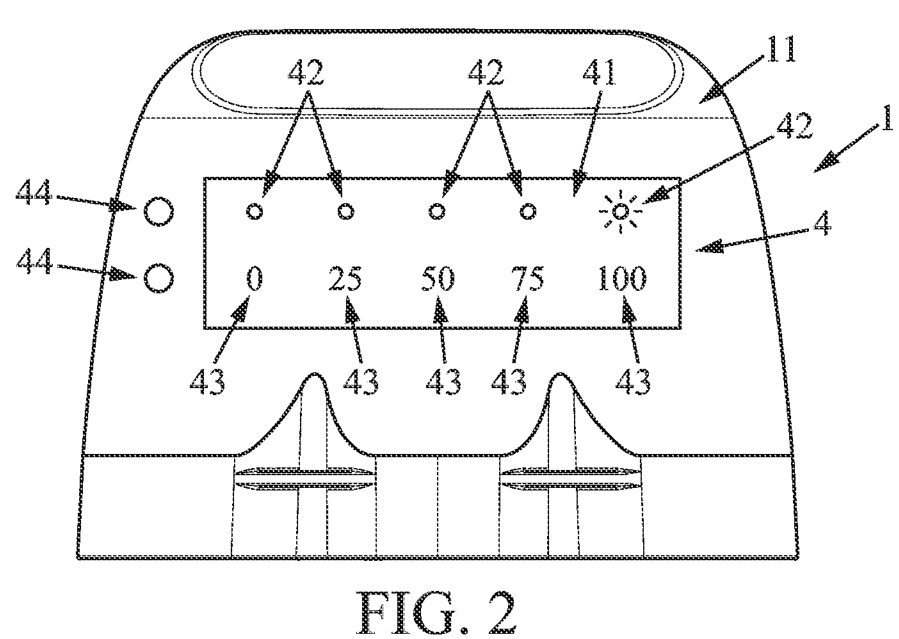
FIG. 2 shows a front view of a device according to an embodiment in accordance with the invention, made under confidentiality by the company BLUEGRioT© on behalf of the Applicant.
Figure 3:
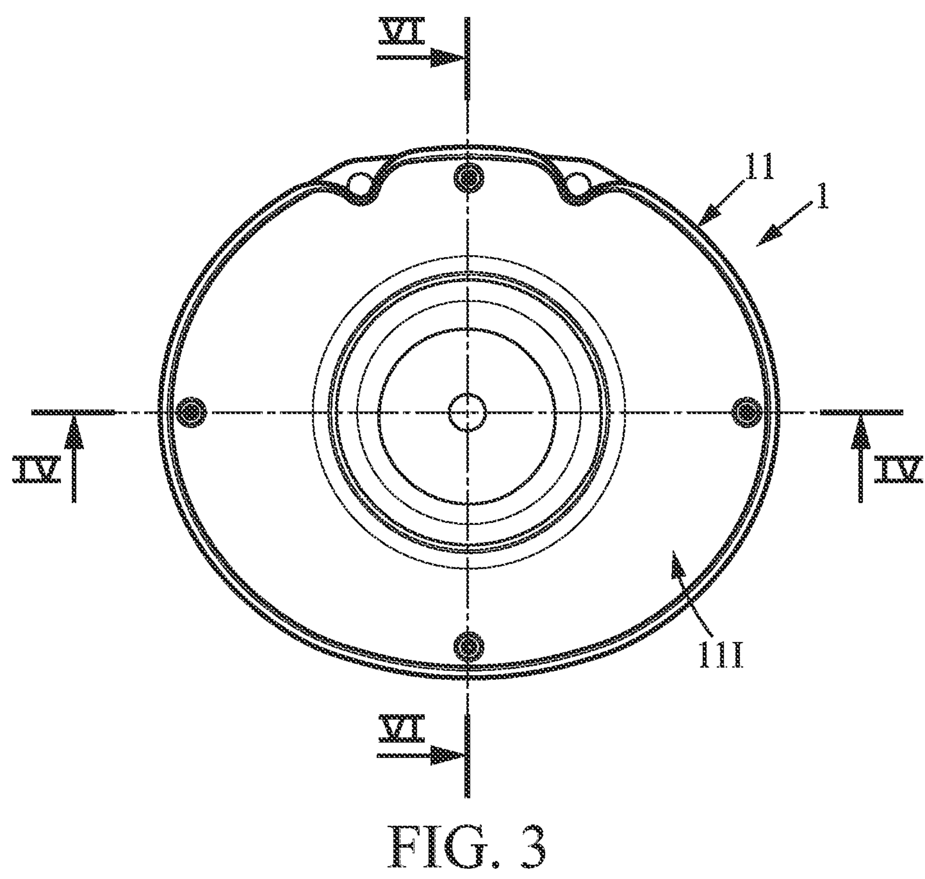
FIG. 3 shows a bottom view of the sensor device of FIG. 2.
Figure 4:
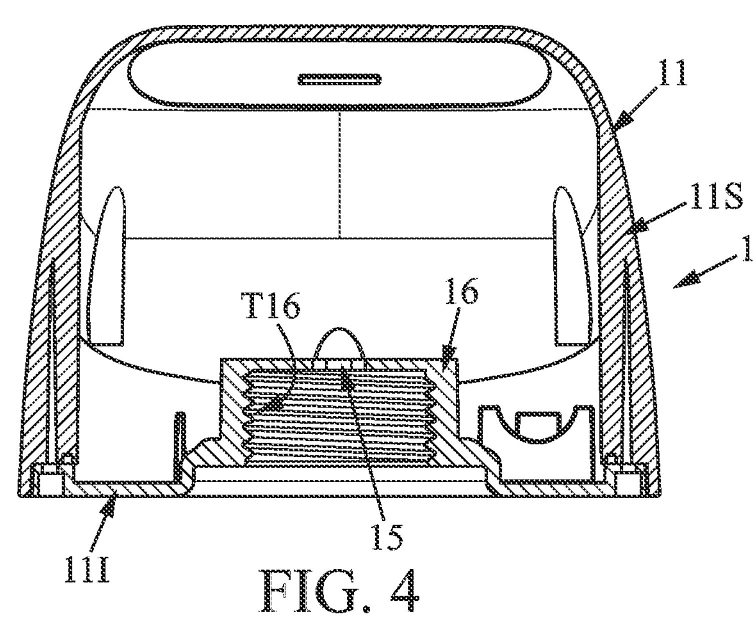
FIG. 4 shows a sectional view along the line IV-IV of FIG. 3 of the sensor device of FIG. 2.

According to one embodiment, and as shown more particularly in the embodiment of FIG. 2, the display 41 comprises a plurality of light-emitting diodes (LEDs) 42 associated to a plurality of markings 43.

Such a design of the display 41 is particularly simple and consumes little energy, in particular in comparison with a screen.

As shown in the embodiment of FIG. 2, the display may for example comprise a plurality of LEDs 42 associated to a plurality of markings 43, so that the display 41 displays information relating to a percentage of material M remaining inside the enclosure 21 of the container 2, for example with regards to the initial amount of material M. Indeed, it is generally not essential for a user of the container 2 to know the exact amount of material M inside the enclosure 21 of the container 2, the latter generally wishing to be able to roughly estimate the amount of material M, to estimate the time point when it is necessary to resupply material M.

Advantageously, the markings 43 are positioned opposite each of the LEDs 42

For example, there may be five LEDs 42 associated respectively with the marking “0”, “25”, “50”, “75” and “100”, so that the display 41 is able to display the level of material M in the enclosure 21 of the container 2 corresponding to a percentage of material M, with a 25% increment.

As a possible complement, the user interface 4 may also comprise at least one actuation button 44, connected to the display 41, the actuation button 44 being configured to trigger a measurement of the level of the material M inside the enclosure 21 of the container 2 by the level sensor 12 and the display of information relating to the level of material M inside the enclosure 21 of the container 2 on the display 41.

As shown in the embodiment of FIG. 2, the actuation button 44 may for example be a pushbutton.

A second actuation button 44 may also be provided, configured to trigger another action performed by the display 41 or by any other element of the sensor device 1. For example, the actuation of the second actuation button 44 may trigger an operating test phase of the display 41 or of the level sensor 12, or of the geolocation means 17 or of any other electronic element of the sensor device 1, during which the operation of the electronic element is tested and information on the operating state of said element is possibly displayed on said display 41. Alternatively, said operation test phase may also be triggered by said first actuation button 44.

In particular, other markings 43, not corresponding to information on the level of material M inside the enclosure 21 of the container 2 may be provided associated with one or more of said LEDs 42 described hereinabove, so that according to the actuation button 44 activated by a user, the lighting of one or more of said LEDs 42 corresponds to information on the level of material M inside the enclosure 21 of the container 2 to information of a different nature.

The sensor device 1 may be equipped with electronic control means comprising for example a processing circuit configured to control the operation of the sensor device 1 according to the invention, said processing circuit including in particular a processor and a memory unit, said memory comprising instructions which, when executed by the processor, allow controlling the operation of the sensor device 1. These electronic means may be housed inside the shell 11 of the sensor device 1.

According to one embodiment, the sensor device 1 further comprises a data transmitter, configured so as to send data from the level sensor 12 towards a remote server, the data comprising data relating to the level of material M inside the enclosure 21 of the container 2 established from the measurement signal emitted by the level sensor 12.

Thus, it is possible to transmit information on the measurement of the level of material M inside the enclosure 21 of the container 2 at a distance from the container 2, and in particular at the location where the logistics of the container 2 are managed, for example the production factory of the material M, to facilitate such logistics.

The sensor device 1 may also include a data receiver, configured so as to receive data from a remote server and to transmit them to said level sensor 12.

Thus, it is possible, for example, to send remote queries to the sensor 12 to trigger a measurement of the level of material M inside the enclosure 21 of the container 2.

The data receiver and/or the data transmitter may also be configured to emit data towards, respectively receive data from, any other element of the sensor device 1, and in particular the geolocation means 17 or the temperature sensor 18 or else the user interface 4, or else update an internal management software of the sensor device 1.

According to one embodiment, the data transmitter is configured to transmit data with a remote server via a low-speed cellular network, over a frequency band comprised between 800 MHz and 1,000 MHz.

The transmission of data via a low-speed single-cell network allows transmitting data over a large distance (several hundred kilometres) with a low energy consumption by the emitter, with the possibility of transmitting data of sufficient size to contain the information relating to the level of material M in the container 2.

For example, the low-speed cellular network may be the SIGFOX© network, which is a low-speed cellular network emitting over the 868-869 MHz frequency band. In particular, the SIGFOX© network has the advantage of being deployed throughout Europe, and soon throughout the world, which enables the monitoring of a container 2 located over a larger geographical area. An alternative is for example the LoRaWAN© network, which is set up in different countries but does not yet offer the possibility of interoperability between countries (known as “roaming”).

Alternatively or complementarily, the sensor device 1 may be equipped with a means using the radio-identification technology, better known as RFID technology (“Radio Frequency Identification”), and in particular the dual-mode RFID technology, in particular in order to enable the identification of the sensor device 1, or else to enable the transfer of data to the memory cooperating with the processor of the electronic control means of the sensor device 1.

According to one embodiment, the sensor device 1 further comprises a temperature sensor 18, configured so as to measure the surrounding temperature of the sensor device 1 and to emit a measurement signal relating to the surrounding temperature of the sensor device 1.

Indeed, and according to the findings of the inventor, in order to ensure the monitoring of the container 2, it may be advantageous to know the temperature, in particular inside its enclosure 21. However, in order to avoid any contact between a temperature sensor and the material M inside the enclosure 21 of the container, which might be detrimental to said material M, it turns out to be particularly advantageous to simply determine the surrounding temperature of the sensor device 1, and therefore of the container 2, outside the shell 11 and therefore the enclosure 21 of the container 2, and possibly to deduce the temperature inside the enclosure 21 of the container 2.

Advantageously, said temperature sensor 18 may be housed inside the shell 11 to minimise the size of the sensor device 1.

According to one embodiment, the sensor device 1 further comprises a magnetic field measuring means 5 configured to emit a measurement signal relating to the magnetic field proximate to said magnetic field measuring means 5, said magnetic field measuring means 5 being advantageously secured to the shell 11, and in particular positioned at the fastening means 16.

Figure 1B:
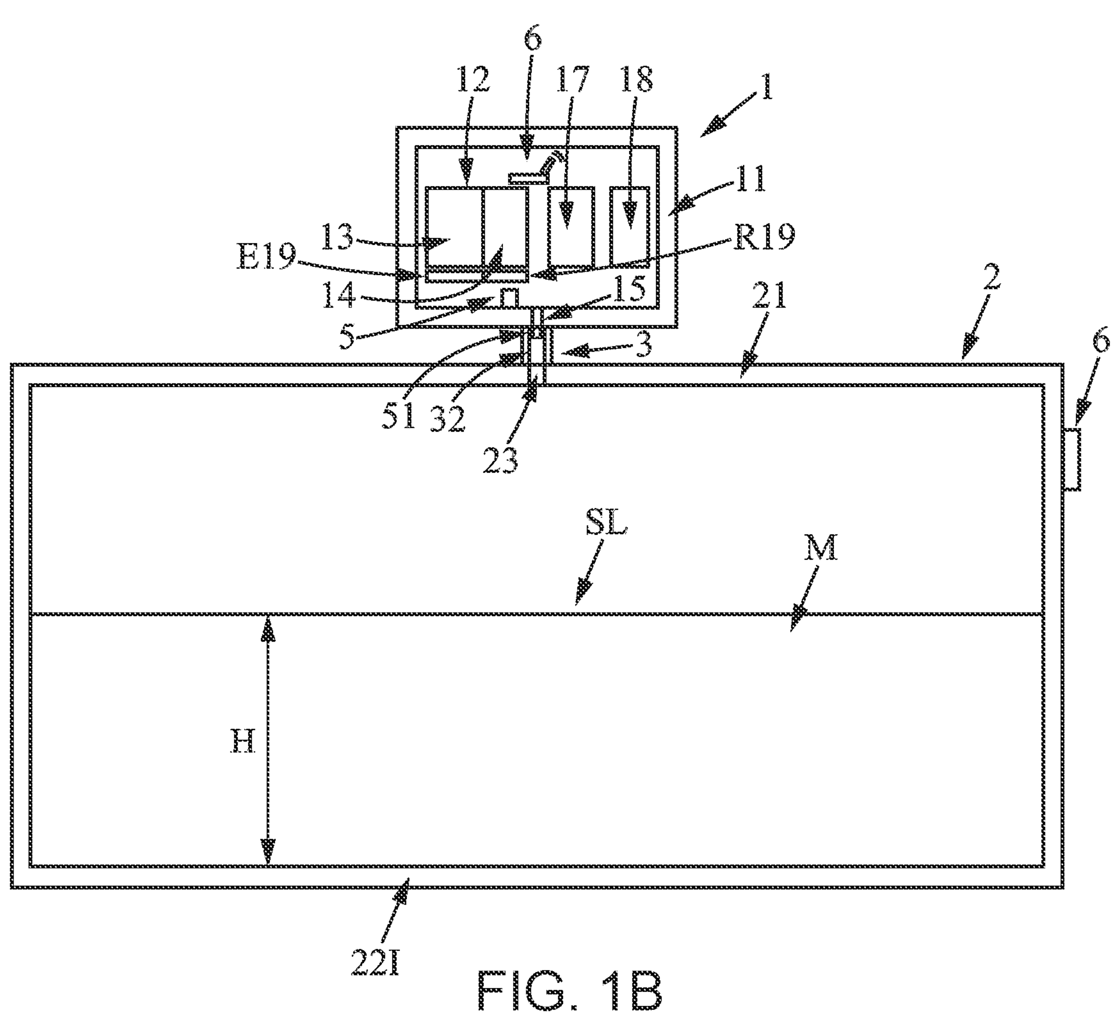
FIG. 1B shows a schematic sectional view of a system comprising a container, a connecting means and a sensor device according to an embodiment in accordance with the invention.
Figure 6A:
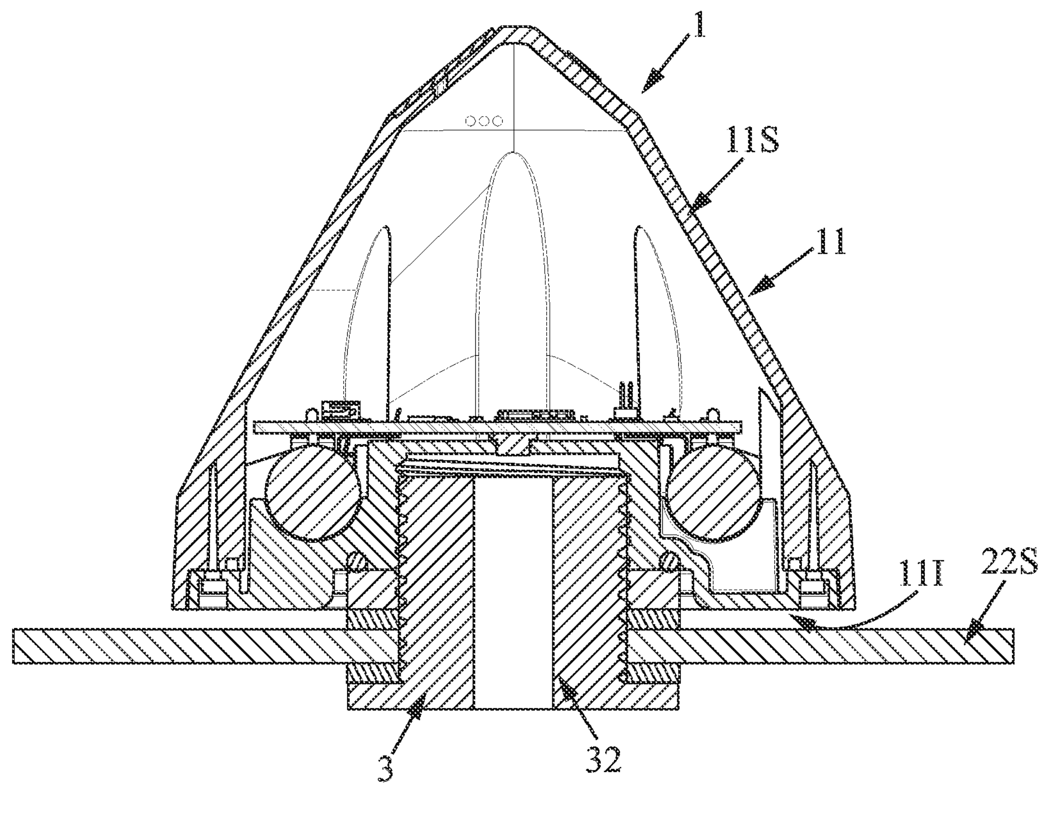
FIG. 6A shows a sectional view along line VI-VI of FIG. 3 of the sensor device of FIG. 2 fastened to a connecting means of a set according to an embodiment in accordance with the invention.
Figure 6B:
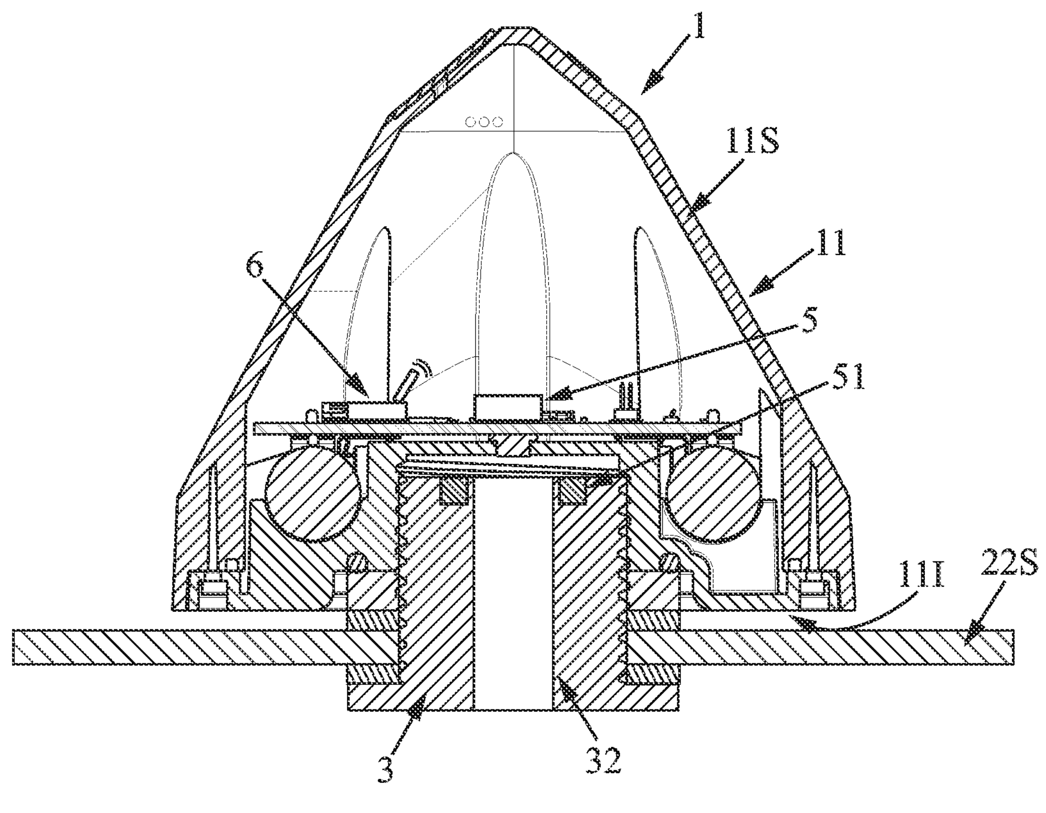
FIG. 6B shows a sectional view along the line VI-VI of FIG. 3 of the sensor device of FIG. 2 fastened to a connecting means of a set according to an embodiment in accordance with the invention.

As shown in the embodiments of FIGS. 1B and 6B, said magnetic field measuring means 5 may advantageously comprise a Hall effect sensor or else a magnetic switch with a flexible blade, also known as a “Reed” switch, advantageously directed towards the bottom of the sensor device 1, and in particular in the direction of the measurement window 15.

Advantageously, said magnetic field measuring means 5 may be connected to said electronic control means and/or to the data transmitter and/or to the data receiver, as described hereinabove.

Advantageously, such a magnetic field measuring means 5 may be intended to measure the magnetic field emitted by elements located proximate to the sensor device 1, and in particular by a detection element 51 made, at least partially, of a magnetic material, secured to a connecting means 3, as described hereinafter, or else of the enclosure 21 of the container 2, and in particular of the wall 22 of the enclosure 21, so as to enable the detection of fastening of the sensor device 1 to the enclosure 21, and in particular via said connecting means 3.

Indeed, said detection element 51 being made, at least partially, of a magnetic material, the value of the magnetic field measured by said magnetic field measuring means 5 when said detection element 51 is proximate thereto increases substantially. In particular, a threshold value may advantageously be determined, such that if the value of the magnetic field measured by said magnetic field measuring means 5 exceeds a first threshold value, it may be concluded that the sensor device 1 is properly fastened, i.e. at the desired position, on the enclosure 21, in particular via said connecting means 3. Also, in order to reduce the consumption of energy, in particular electricity, of said sensor device 1, the sensor device 1 may be configured so as to switch into standby if it is not detected, via said magnetic field measuring means 5, that the sensor device 1 is properly fastened on the enclosure 21 of the container 2 and to wake up if it is detected, via said magnetic field measuring means 5, that the sensor device 1 is properly fastened on the enclosure 21 of the container 2.

Figure 7B:
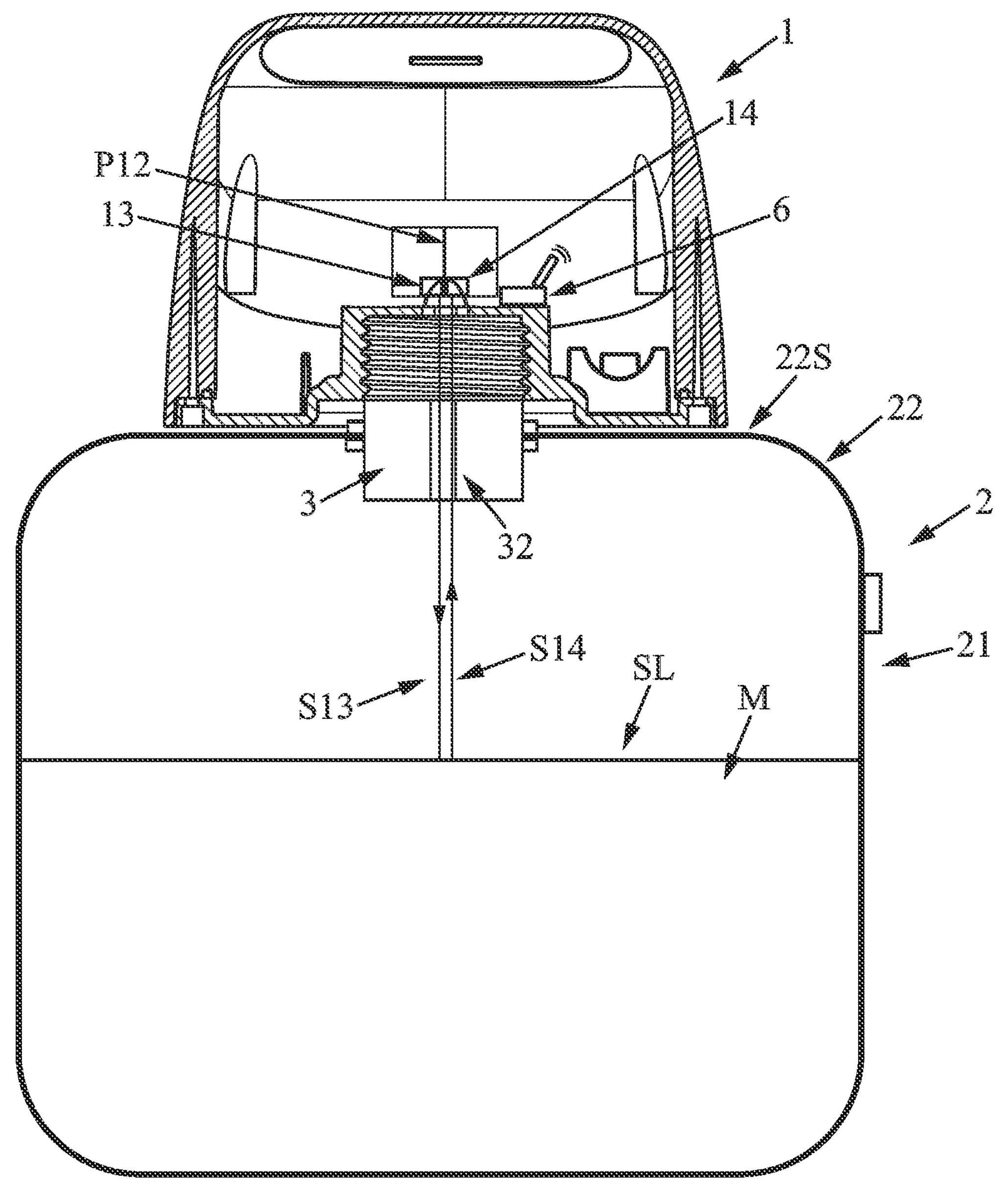
FIG. 7B shows a sectional view along the line IV-IV of FIG. 3 of the sensor device of FIG. 2 fastened to a wall of the enclosure of a container, represented entirely, via a connecting means, of a system according to an embodiment in accordance with the invention.

According to one embodiment, as shown in the embodiment of FIGS. 1B, 6B, and 7B, said sensor device 1 comprises an RFID ("Radio Frequency Identification") transponder 6 comprising a memory with data relating to the sensor device 1.

Advantageously, said RFID transponder 6 may be configured to emit and receive radio waves at Ultra High Frequencies. In general, Ultra High Frequency radio waves are comprised between 860 and 960 MHz.

In particular, the data relating to the sensor device 1 may comprise data enabling the identification of the sensor device 1, such as a unique identification reference.

Thus, as explained hereinabove, such an RFID transponder 6 may be intended to allow performing the identification of the sensor device 1, by cooperating with an RFID reader, configured to read identification data of the sensor device 1 stored in the memory of the RFID transponder 6. For example, such a reader may be installed on a site, in which containers 2 are filled with unstable material M, and in which a sensor device 1 is fastened on said containers 2 after filling thereof with unstable material M.

Advantageously, said RFID transponder 6 may be connected, and in particular by at least one wired connection, to said electronic control means and/or to the data transmitter and/or to the data receiver, as described hereinabove, so as to enable data reading and/or writing in the memory of said RFID transponder 6 by said electronic control means or via the data transmitter and/or the data receiver.

According to one embodiment, as shown in the embodiment of FIGS. 1B and 7B:

- the emitter 13 is configured to emit an optical detection signal S13, and in particular a light, in particular infrared, and preferably laser,
- the receiver 14 is configured to receive a reflected optical detection signal S14, and in particular a light, in particular infrared, and preferably laser,
- at least one lens E19, R19 is interposed between the emitter 13, respectively the receiver 14, and the measurement window 15.

Indeed, and according to the findings of the inventor, and despite the prejudices of the prior art regarding the use of optical detection means for measuring the level of a surface of a liquid, and in particular regarding the inaccuracy and/or the risk of errors in the measurements of the level of a surface of a liquid by means of an optical signal, and in particular a light, because of the reflection and the diffraction of penetrating or reflecting light rays upon passage into a liquid medium, it turns out that the use of an emitter 13 configured to emit an optical detection signal S13, in particular infrared, and in particular laser, in the same manner a receiver 14 configured to receive a reflected optical detection signal S14, in particular infrared, and in particular laser, in combination with the at least one lens E19, R19 interposed between the emitter 13, respectively the receiver 14, and the measurement window 15 allows obtaining a particularly reliable and accurate measurement signal relating to the level of material M inside the enclosure 21 of the container 2.

Thus, the level of the free surface SL of the material M inside the enclosure 21 of a container 2 can be determined according to the speed of movement of light and the time elapsed between the emission of a detection signal S13 emitted by the emitter 13 and the reception by said receiver 14 of the reflected detection signal S14, formed by said detection signal S13 after reflection against the free surface SL of the material M inside the enclosure 21 of container 2.

Also, the at least one lens E19, R19 interposed between the emitter 13, respectively the receiver 14, and the measurement window 15, respectively allows directing the detection signals S13 emitted by the receiver 13 towards the free surface SL of the material M inside the enclosure 21 of a container 2, respectively directing the reflected detection signal S14 towards the receiver 14 inside the shell 11. This advantageously allows dispensing with a tedious step of calibrating the level sensor 12 upon fastening thereof on a container 2 to ensure the adequate orientation of the receiver 14, and of the emitter 13, with respect to the enclosure 21 of the container 2 so that a detection signal S13 emitted by the emitter 13 reaches the free surface SL of the material M inside the enclosure 21 of the container 2, and/or to a reflected detection signal S14 to reach the receiver 14.

Advantageously, the emitter 13 and/or the receiver 14 and/or the at least one lens E19 interposed between the emitter 13 and the measurement window 15 and/or the at least one lens R19 interposed between the receiver 14 and the measurement window 15 may be integrated on the same electronic component, for example the sensor referenced VL53L1X marketed by the company STMICROELECTRONICS®.

According to one embodiment, and as shown more particularly in the embodiment of FIG. 7B, an optical separation wall P12 separates the emitter 13 from the receiver 14, said optical separation wall P12 being configured so as to prevent an optical detection signal S13 emitted by said receiver 13 to reach said receiver 14 without having crossed said measurement window 15 so as to come out of the shell 11.

This advantageous arrangement of the invention advantageously allows getting rid of the measurement errors that could be due to fouling of the measurement window 15, and in particular of its plugging wall as described hereinabove. Indeed, and in the case of at least partial fouling of the measurement window 15, and in particular of its plugging wall, reducing, at least partially, its transparency, an optical detection signal S13 emitted by said emitter 13 might be reflected by said fouled portion of the measurement window 15 and directly reach the receiver 14, without having reached the free surface SL of the material M stored in the enclosure 21 of a container 2, and therefore generating an erroneous measurement of the level of material M in the enclosure 21 of the container 2.

On the contrary, the optical separation wall P12 prevents a detection signal S13 emitted by said emitter 13 from reaching the receiver 14 without having crossed the measurement window 15, and therefore from having been reflected by the free surface SL of the material. M in the enclosure 21 of the container 2, and therefore prevents measurement errors that might result therefrom.

Advantageously, the emitter 13, the receiver 14, and the optical separation wall P12 may be integrated on the same electronic component, for example the sensor referenced VL53L1X marketed by the company STMICROELECTRONICS®.

Figure 11:
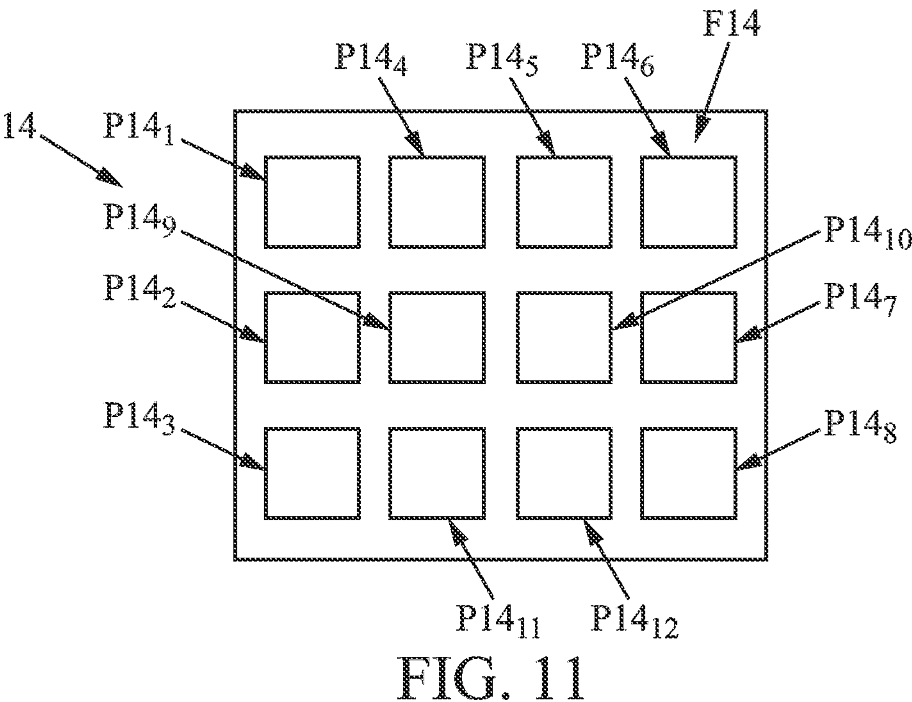
FIG. 11 is a schematic bottom view of a receiver of a level sensor of a sensor device according to an embodiment in accordance with the invention.
Figure 12A:
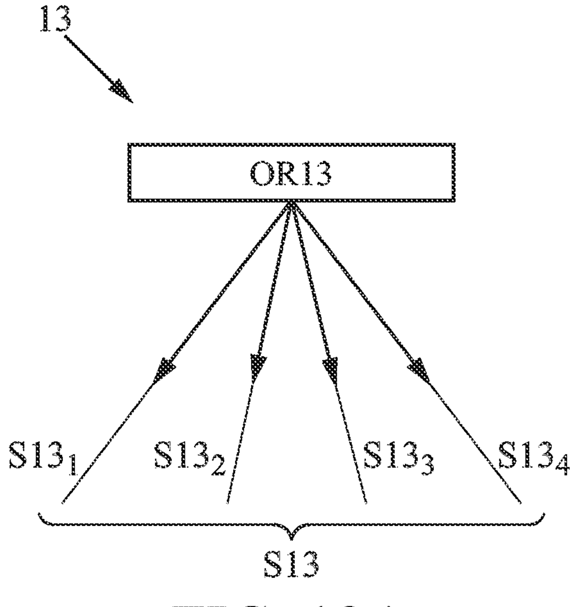
FIG. 12A is a schematic front view of an emitter of a level sensor of a sensor device according to an embodiment in accordance with the invention.
Figure 12B:
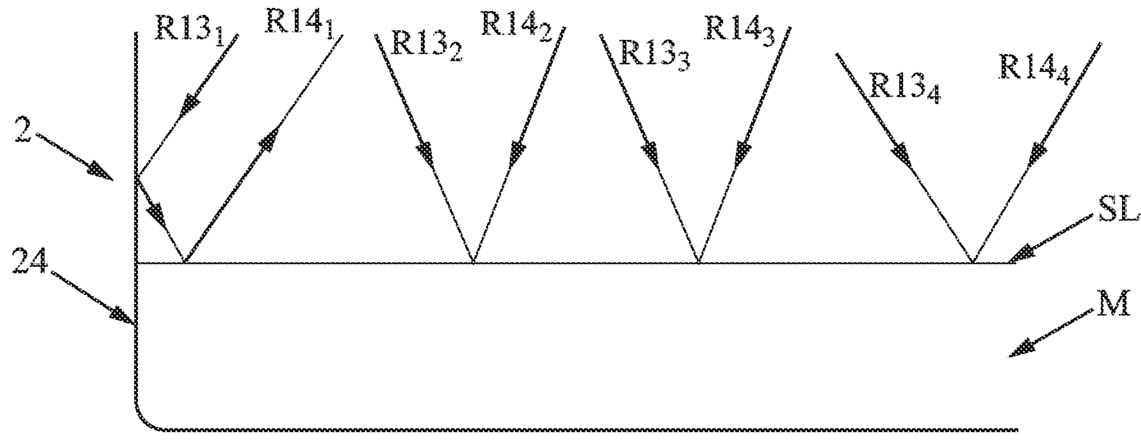
FIG. 12B is a schematic front sectional view of the inside of the enclosure of a container to a wall of which is fastened a sensor device according to an embodiment in accordance with the invention.
Figure 12C:
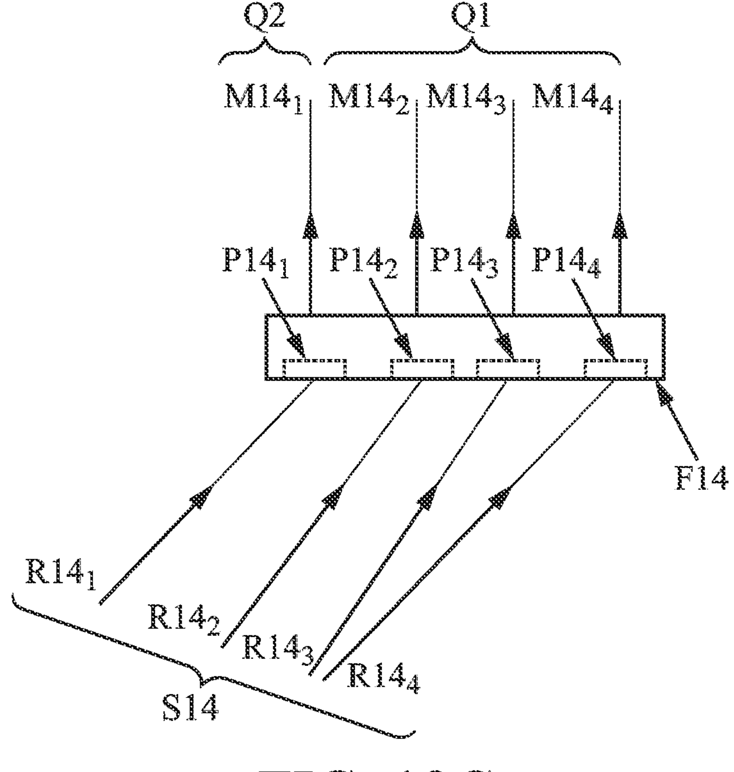
FIG. 12C is a schematic front view of a receiver of a level sensor of a sensor device according to an embodiment in accordance with the invention.

According to one embodiment:

- the emitter 13 is configured so as to emit a detection signal S13 including a plurality of emission light rays R13$_1$ . . . R13$_n$, having advantageously a common origin OR13 at the emitter 13, as shown in the embodiment of FIG. 12A, at least two emission light rays R13$_1$ . . . R13$_n$ each having a different orientation with respect to said emitter 13, and in particular so that all of the light rays R13$_1$ . . . R13$_n$ substantially form a cone with an origin O13, and so that the reflected detection signal S14 received by the receiver 14 includes a plurality of reflected detection light rays R14$_1$ . . . R14$_n$, advantageously with at least two reflected detection light rays R14$_1$ . . . R14$_n$ each having a different orientation with respect to said receiver 14, as shown in the embodiment of FIG. 12C, each formed by an emission light ray R13$_1$ . . . R13$_n$ of the detection signal S13 emitted by the emitter 13 after at least one reflection against a wall 22, 24 of the enclosure 21 of the container 2 and/or against the free surface SL of the material M inside the enclosure 21 of the container 2, as shown in the embodiment of FIG. 12B,
- the receiver 14 includes a plurality of receiver units P14$_1$ . . . P14$_n$ evenly distributed over a substantially planar surface F14 directed towards the measurement window 15, and configured so as to receive only a single reflected detection ray R14$_1$ . . . R14$_n$ of the reflected detection signal S14, the receiver 14 being configured so as to emit as many measurement signals M14$_1$ . . . M14$_n$ as receiver units P14$_1$ . . . P14$_n$, possibly distinct, each determined as a function of the unique reflected detection ray R14$_1$ . . . R14$_n$ received at each receiver unit P14$_1$ . . . P14$_n$, as shown in the embodiments of FIGS. 11 and 12C,
- the measurement signal emitted by said level sensor 12 relating to the level of the material M inside the enclosure 21 of the container 2 being determined as a function of the different measurement signals M14$_1$ . . . M14$_n$ emitted by the receiver 14 determined from the different receiver units P14$_1$ . . . P14$_n$.

For example, each receiver unit P14$_1$ . . . P14$_n$ may be a single photon avalanche diode (also known by the acronym SPAD).

By evenly distributed, it should be understood that the different receiver units P14$_1$ . . . . P14$_n$ form on said planar surface F14 a regular geometric shape, such as a rectangle, as shown in the embodiment of FIG. 11, or a circle, and that two consecutive receiver units P14$_1$ . . . P14$_n$ are spaced apart by the same distance.

Advantageously, such an emitter 13 and such a receiver 14 may be integrated on the same electronic component, and in particular the sensor referenced VL53L1X marketed by the company STMICROELECTRONICS®.

This advantageous arrangement of the invention allows dispensing with a tedious step of calibrating the level sensor 12 upon fastening thereof on a container 2 to ensure the adequate orientation of the receiver 14, and of the emitter 13, with respect to the enclosure 21 of the container 2 so that a detection signal S13 emitted by the emitter 13 reaches the free surface SL of the material M inside the enclosure 21 of the container 2, and/or that a reflected detection signal S14 reaches the receiver 14.

Indeed, according to the findings of the inventor, and in particular when the level of material M inside the enclosure 21 of the container 2 is low, i.e. for example lower than 50 cm, a detection signal S13 emitted by the emitter 13 could reach, at least in part, a wall 24, and in particular a lateral wall 24, of the enclosure 21 and could be reflected by this said wall 24 before reaching the free surface SL of the material M and to be reflected thereby to form, at least in part, the reflected detection signal S14 received by said receiver 14, which will increase the time elapsed between the emission of at least one portion of the detection signal S13 emitted by the emitter 13 and the reception of at least one portion of the reflected detection signal S14 received by the receiver 14 and therefore distort the measurement of the level of the material M inside the enclosure 21 of the container 2.

On the contrary, according to the findings of the inventor, with the emitter 13 and the receiver 14 according to such an embodiment of the invention, among the plurality of emission light rays R13$_1$ . . . R13$_n$ of the emission signal S13, and in particular those each having a different orientation with respect to said emitter 13, there could be a first amount Q1 thereof which are reflected only by the free surface SL of the material M inside the enclosure 21 of the container 2 and each could form a reflected detection light ray R14$_1$ . . . R14$_n$ of the detection signal S14 each reaching a detection unit P14$_1$ . . . P14$_n$.

Among the plurality of emission light rays R13$_1$ . . . R13$_n$ of the emission signal S13, and in particular those each having a different orientation with respect to said emitter 13, there may also be a second amount Q2 thereof, possibly strictly less than the first amount Q1, which are reflected by the wall 24 of the enclosure 21 before or after being reflected by the free surface SL of the material M inside the enclosure 21 of the container 2 and each forming a reflected detection light ray R14$_1$ . . . R14$_n$ of the detection signal S14 reaching a detection unit P14$_1$ . . . P14$_n$.

Among the plurality of emission light rays R13$_1$ . . . R13$_n$ of the emission signal S13, and in particular those each having a different orientation with respect to said emitter 13, there may also be a third amount Q3 thereof which do not form a reflected detection light ray $R14_1$ . . . $R14_n$ of the detection signal S14, because they do not reach a detection unit $P14_1$ . . . $P14_n$.

Henceforth, the measurement signals $M14_1$ . . . $M14_n$ determined from a first amount Q1 of the detection units $P14_1$ . . . $P14_n$ as a function of the reflected detection light rays $R14_1$ . . . R14n of the detection signal S14 derived from the first amount Q1 of emission light rays $R13_1$ . . . $R13_n$ of the emission signal S13 received thereby may be substantially identical, since they correspond to substantially identical travel times of the light between the emitter 13 and the receiver 14.

On the contrary, the rest of the detection units $P14_1$ . . . $P14_n$ could either not be reached by a reflected detection beam $R14_1$ . . . . $R14_n$ of the detection signal S14, or be reached, for an amount Q2 of detection units $P14_1$ . . . $P14_n$, by a reflected detection ray $R14_1$ . . . $R14_n$, of the detection signal S14 of the second amount Q2 of emission rays $R13_1$ . . . $R13_n$ of the emission signal S13. The measurement signals $M14_1$ . . . $M14_n$ determined from these detection units $P14_1$ . . . $P14_n$ are substantially different from the measurement signals $M14_1$ . . . $M14_n$ determined from the first amount Q1 of the detection units $P14_1$ . . . $P14_n$, and in particular correspond to an aberrant value of the level of material M inside the enclosure 21 of the container 2, for example higher than the maximum height, substantially along the Vertical, of the enclosure 21.

Thus, for example, only the measurement signals $M14_1$ . . . . $M14_n$ determined from the first amount Q1 of the detection units $P14_1$ . . . $P14_n$ could be taken into account for the determination of the measurement signal emitted by said level sensor 12 relating to the level of the material M inside the enclosure 21 of the container 2, the other measurement signals $M14_1$ . . . $M14_n$.

In particular, according to one embodiment, the measurement signal emitted by the level sensor 12 relating to the level of the material M inside the enclosure 21 of the container 2 is determined by:

/a/ considering a first amount Q1 of measurement signals $M14_1$ . . . $M14_n$ emitted by the receiver 14 determined from a first amount Q1 of receiver units $P14_1$ . . . $P14_n$, such that each of said measurement signals $M14_1$ . . . $M14_n$ of said first amount Q1 corresponds to a travel time of an emission light ray $R13_1$ . . . $R13_n$ reflected only by the free surface SL of the material M in the enclosure 21 of the container 2 before forming a reflected detection light ray $R14_1$ . . . $R14_n$, each of said measurement signals $M14_1$ . . . $M14_n$ of the first amount Q1 being advantageously substantially identical, /b/ considering a second amount Q2 of measurement signals $M14_1$ . . . $M14_n$ emitted by the receiver 14 determined from a second amount Q2 of receiver units $P14_1$ . . . $P14_n$, such that each of said measurement signals $M14_1$ . . . $M14_n$ of said second amount Q2 corresponds to a travel time of an emission light ray $R13_1$ . . . $R13_n$ reflected by at least one wall 24, and in particular a lateral wall 24, of the enclosure 21 and by the free surface SL of the material M in the enclosure 21 of the container 2, before and/or after having been reflected by said wall 24 of the enclosure 21, before forming a reflected detection light ray $R14_1$ . . . $R14_n$, and strictly longer than the travel time corresponding to the measurement signals $M14_1$ . . . $M14_n$ of the first amount Q1, each of said measurement signals $M14_1$ . . . $M14_n$ of the second amount Q2 being advantageously different from the measurement signals $M14_1$ . . . $M14_n$ of the first amount Q1, and each of which could in particular correspond to aberrant values of the possible travel time of an emission light ray $R13_1$ . . . $R13_n$ having been reflected only by the free surface SL of the material M in the enclosure 21 of the container 2 before forming a reflected detection light ray $R14_1$ . . . $R14_n$, /c/ discriminating the measurement signals $M14_1$ . . . $M14_n$ of the second amount Q2 of measurement signals $M14_1$ . . . $M14_n$ et taking into account only the measurement signals $M14_1$ . . . $M14_n$ of the first amount Q1 of measurement signals $M14_1$ . . . $M14_n$ to determine the measurement signal emitted by the level sensor 12, for example by performing an average of the measurement signals $M14_1$ . . . $M14_n$ of the first amount Q1.

Thus, the sensor device 12 is capable of determining autonomously, automatically, and without a tedious calibration step, the measurement signals $M14_1$ . . . $M14_n$ that are relevant for determining the measurement signal emitted by the level sensor 12 relating to the level of the material M inside the enclosure 21 of the container 2, and to discard those that would distort the determination of this measurement signal emitted by said level sensor 12.

Indeed, the sensor device 1 being fastened to the enclosure 21 of a container 2 via the connecting means 3, in a position which is not constant, and in particular in rotation according the axis of the thread T16 of the fastening means 16 or of the tapping 31, the receiver units $P14_1$ . . . $P14_n$ of the receiver 14 do not have a fixed position with respect to the enclosure 21 of the container 2, and in particular with respect to said lateral wall 24. Hence, it is particularly advantageous to be able to determine autonomously and automatically which ones receive a reflected detection light ray $R14_1$ . . . $R14_n$ relevant for the determination of the measurement signal emitted by the level sensor 12 relating to the level of the material M inside the enclosure 21 of the container 2, i.e. those derived from an emission light ray $R13_1$ . . . $R13_n$ reflected only by the free surface SL of the material M inside the enclosure 21 of the container 2, and which ones receive a reflected detection light ray $R14_1$ . . . $R14_n$ irrelevant for the determination of the measurement signal emitted by the level sensor 12 relating to the level of the material M inside the enclosure 21 of the container 2, i.e. those derived from an emission light ray $R13_1$ . . . $R13_n$ reflected by a wall 24, and in particular a lateral wall 24 of the enclosure 21 of the container 2 then by the free surface SL of the material M inside the enclosure 21 of the container 2.

The invention also relates to a set comprising:

a sensor device 1 according to one of the previously-described embodiments, a connecting means 3, able to be secured to a wall 22 of the enclosure 21 of a container 2.

According to the invention, the connecting means 3 has a through hole 32 intended to be positioned opposite and in line with an opening 23 formed in said wall 22 of the enclosure 21 of the container 2.

According to the invention, the sensor device 1 is configured to be removably fastened on the connecting means 3 via its fastening means 16 with the measurement window 15 of its shell 11 opposite and in line with the through hole 32 of the connecting means 3 and the opening 23 formed in the wall 22 of the enclosure 21 of the container 2, said through hole 32 being configured to be crossed by the detection signal emitted S13 by the emitter 13 and by the reflected detection signal 14 intended to be received by the receiver 14.

All of the previously-described arrangements and advantages regarding the sensor device 1 and the connecting means 3 apply to the set according to the invention.

According to one embodiment:

the fastening means 16 of the sensor device 1 comprises a thread T16 surrounding the measurement window 15 of the shell 11 of the sensor device 1, and the connecting means 3 includes a tapping 31 surrounding said through hole 32, the tapping 31 being configured to surround the opening formed in the wall 22 of the enclosure 21 of the container 22, the tapping 31 being configured to cooperate with said thread T16 of the fastening means 16 to ensure the removable fastening of the sensor device 1 on said connecting means 3 by screwing/unscrewing.

According to one embodiment, the connecting means 3 may be fastened in a non-removable manner to said wall 22 of the enclosure 21 of the container 2, or else be formed, at least in part, in one piece and integral with said wall 22 of the enclosure 21 of the container 2, and in particular in the case where the connecting means 3 is made of the same material as said wall 22 of the enclosure 21 of the container 2, for example made of a thermoplastic material.

According to an alternative embodiment, the connecting means 3 may be removably fastened to said wall 22 of the enclosure 21 of the container 2, in particular in order to facilitate the maintenance operations on said connecting means 3 or on said container 2 requiring the dismount of the connecting means 3 of the wall 22 of the enclosure 21 of the container.

Figure 5:
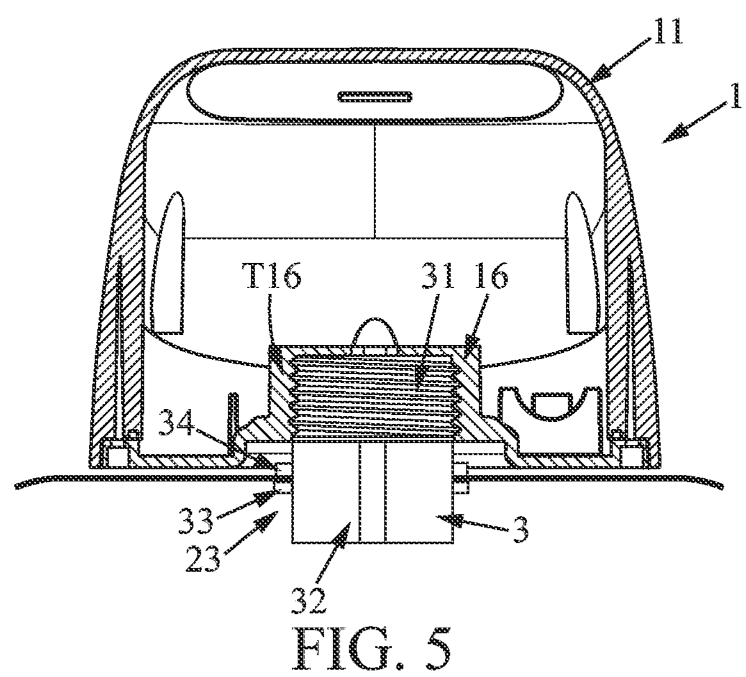
FIG. 5 shows a sectional view along the line IV-IV of FIG. 3 of the sensor device of FIG. 2 fastened to a wall of the enclosure of a container, represented partially, via a connecting means, of a system according to an embodiment in accordance with the invention.

In particular, and as shown more particularly in the embodiment of FIGS. 5 to 7, the connecting means 3 may include a first stop wall 33 and a second stop wall 34 positioned opposite and substantially parallel to the first stop wall 33, and movable in translation relative to the first stop wall 33, the first stop wall 33 and the second stop wall 34 being configured to grasp the wall 22 of the enclosure 21 of the container 2 in order to ensure fastening of the connecting means 3 to the enclosure 21 of the container 2.

Advantageously, and in order to ensure sealing between the connecting means 3 and the wall 22 of the enclosure 21 of the container 2, a sealing means (not represented), such as an O-ring gasket, may be interposed between said first stop wall 33 and wall 22 of the enclosure 21 of the container 2 and/or between said second stop wall 34 and the wall 22 of the enclosure 21 of the container 2.

The first stop wall 33 and/or the second stop wall 34 may be intended to move in translation relative to the connecting means 3 by screwing/unscrewing, so as to ensure the translational movement of the second stop wall 34 relative to the first stop wall 33, which also allows ensuring locking of the position of the second stop wall 34 relative to the first stop wall 33. Thus, fastening of the connecting means on the wall 22 of the enclosure 21 of the container 2 is done like a cable gland.

Alternatively or complementarily, a means for locking the position of the second stop wall 34 with respect to the first stop wall 33 may be provided.

According to one embodiment:

the sensor device 1 comprises the magnetic field measuring means 5 configured to emit a measurement signal relating to the magnetic field proximate to said magnetic field measuring means 5, as described hereinabove, and the connecting means 3 includes a detection element 51 made, at least partially, of a magnetic material, configured to emit a magnetic field able to be measured by said magnetic field measuring means 5 of the sensor device 1 when said sensor device 1 is fastened to said connecting means 3.

Thus, thanks to this advantageous arrangement of the invention, and as explained hereinabove, as said detection element 51 is made, at least partially, of a magnetic material, the value of the magnetic field measured by said magnetic field measuring means 5 when said detection element 51 is nearby increases substantially. Thus, the measured value of the magnetic field by said magnetic field measuring means 5, which exceeds for example a fixed threshold value, allows automatically confirming the adequate fastening, i.e. in the desired position, of the sensor device 1 to the connecting means 3, and therefore advantageously to the wall 22 of an enclosure 21 of the container 2, or else activating or deactivating the standby of the sensor device 1, as explained hereinabove.

According to one embodiment:

the magnetic field measuring means 5 is positioned proximate to the thread T16 of the fastening means 16, the detection element 51 is positioned proximate to the tapping 31 surrounding said through hole 32.

As explained hereinabove, the thread T16 of the fastening means 16 and the tapping 31 surrounding the through hole 32 are the elements that cooperate directly to ensure fastening of the sensor device 1 to the connecting means 3 in a desired position, and therefore advantageously to the wall 22 of an enclosure 21 of the container 2. Therefore, such a positioning of the magnetic field measuring means 5 and of the detection element 51 allows obtaining a reliable means for automatically ensuring the adequate fastening of the sensor device 1 to the connecting means 3.

In addition, as the thread T16 of the fastening means 16 and the tapping 31 surrounding the through hole 32 are adjoined against each other when the sensor device 1 is properly fastened to the connecting means 3, the dimensions of the detection element 51, and advantageously of the magnetic field measuring means 5, could be substantially reduced, and nevertheless allow detecting a value of the magnetic field measured by said magnetic field measuring means 5 characteristic of the adequate fastening of the sensor device 1 to the connecting means 3, and in particular a value of the magnetic field exceeding a fixed threshold value.

According to one embodiment, the detection element 51 is completely made of a magnetic material and has a substantially annular shape and is positioned so as to surround the through hole 32 of the connecting means 3.

As shown in the embodiment of FIG. 6B, this advantageous arrangement of the invention allows minimising the size of the detection element 51 at the connecting means 3, and without plugging the through hole 32, so as not to disturb the passage of an emission signal S13 emitted by the emitter 13 of the level sensor 12 or that of a detection signal S14 emitted by the receiver 14 of the level sensor 12, and therefore not to hinder the operation of the level sensor 12 of the sensor device 1.

Advantageously, said detection element 51 may be received in a housing with a shape substantially identical to that of the detection element 51, and therefore in particular substantially annular, opening at the upper portion of the connecting means 3, above the through hole 32 and the tapping 31, so as to facilitate mounting thereof. Said housing, and therefore said detection element 51 may have their axis of revolution substantially coincident with that of the through hole 32 and that of the tapping 31. Said housing and therefore said detection element 51 may be positioned according to a radial direction of the through hole between the tapping 31 and the through hole 32.

The annular shape of the detection element 51 and the fact that it is completely made of a magnetic material also turns out to be particularly advantageous in that, once the sensor device 1 is fastened to the connecting means 3 by screwing the thread T16 on the tapping 31, the magnetic field measuring means 5 is necessarily located opposite a portion made of a magnetic material of the detection element 51, which is therefore able to emit a magnetic field whose value measured by said magnetic field measuring means 5 is characteristic of the adequate fastening of the sensor device 1 to the connecting means 3, and therefore advantageously to the wall 22 of an enclosure 21 of the container 2, and for example by exceeding a fixed threshold value.

Advantageously, said detection element 51 may be completely made of a magnetic metallic material, and preferably of neodymium. Indeed, neodymium has the advantage of emitting a sufficiently powerful magnetic field, even with a detection element 51 with reduced dimensions, to be measured by said magnetic field measuring means 5 when it is proximate to said detection element 51, and allow automatically concluding on the adequate fastening of the sensor device 1 to the connecting means 3, and without any risk of error, because such a value of the magnetic field measured when said detection element 51 is made of Neodymium is much higher than the value of the magnetic field that might be measured because of the presence nearby of other elements made of a magnetic material, and in particular metal.

The invention also relates to a system comprising:

- a set according to one of the previously-described embodiments,
- a container 2 including a sealed enclosure 21, the enclosure 21 comprising a wall 22, the enclosure 21 being able to contain material M, an opening 23 being formed in the wall 22 of the enclosure 21, the opening 23 being configured to connect the inside and the outside of the enclosure 21.

According to the invention, the connecting means 3 is secured to the wall 22 of the enclosure 21 with its through hole 32 opposite and in line with the opening 23 of the container 2.

According to the invention, the sensor device 1 is removably fastened to the connecting means 3 with its measurement window 15 in line with the through hole 32 of the connecting means 3 and of the opening 23 of the container 2, so that the emitter 13 of the level sensor 12 is able to emit the detection signal S13 towards the inside of the enclosure 21 of the container 2 and that the receiver 14 of the level sensor 14 is able to receive said reflected detection signal S14, after reflection against the free surface SL of the material M inside the enclosure 21 of the container 2.

All of the previously-described arrangement regarding the sensor device 1, the connecting means 3 and the container 2 apply to the system according to the invention.

In particular, the container 2 of the set may be a container whose enclosure 21 has a capacity larger than 300 litres.

A verification means (not represented) may be provided, connecting the sensor device 1 to the connecting means 3 or to the container 2, and configured so as to allow ensuring that the sensor device 1 has not been detached off the connecting means 3, respectively off the container 2. In particular, said verification means may comprise a sealing, intended to remain intact if the sensor device 1 has not been detached off the connecting means 3, respectively detached off the container 2.

According to one embodiment, the opening 23 is formed in an upper wall 22S of the enclosure 21 and the sensor device 1 is fastened on an upper wall 22S of the enclosure 21 of the container 2.

This position of the opening 23 and of the sensor device 1 turns out to be particularly advantageous, in that generally, the upper wall 22S of the enclosure 21 of a container 2 is clear and accessible, unlike a lower wall 22I intended to rest on the ground or a lateral wall, which may be proximate to a wall. Thus, the sensor device 1 is easily accessible and its installation on the container 2 is simple and quick.

Also, and as shown more particularly in the embodiments of FIGS. 1 and 7, the free surface SL of the material M inside the enclosure 21 of the container 2 is generally located at the upper portion thereof, opposite said upper wall 22S of the enclosure 21. Hence, the level sensor 12 of the sensor device 1 is located the closest to the free surface SL of the material M, which facilitates the measurement of the level of material M inside the enclosure 21 of the container 2, on which the detection signal S13 emitted by the emitter 13 of the level sensor 12 is reflected and forms, at least partially, said reflected detection signal S14 received by the receiver 14.

In addition, such an arrangement of the sensor device 1 promotes the emission of data via the data transmitter, when the sensor device 1 includes one, as the waves emitted by said data emitter are less likely to encounter obstacles disturbing their progress.

Such an arrangement of the sensor device 1 also promotes the reception of data via the data receiver, when the sensor device 1 includes one, in that the waves received by said data receiver are less likely to encounter obstacles disturbing their progress.

According to one embodiment, the enclosure 21 of the container 2 contains unstable material M, the unstable material M having characteristics changing over time.

In particular, such an unstable material M may be yeast or leaven, in particular liquid yeast or leaven whose characteristics change over time because of the living organisms that it contains.

Indeed, an unstable material M having characteristics changing over time, it turns out to be particularly advantageous to be able to monitor its characteristic values over time, and in particular its volume (corresponding to the level of material M inside the enclosure 21 of the container 2), or else its temperature (determined using the surrounding temperature sensor 18). Hence, the system according to the invention is particularly suitable for storage with an easier logistics management for unstable material M and in particular yeast or leaven, in particular liquid.

According to one embodiment:

- the sensor device 1 comprises an RFID transponder 6 comprising a storage memory with data relating to the sensor device 1, as described hereinabove,
- an RFID transponder 7 comprising a storage memory with data relating to the container 2, is fastened on the enclosure 21 of the container 2.

All of the previously-described arrangement regarding the RFID transponder 6 of the sensor device 1 could apply to such an embodiment of the set.

Like said RFID transponder 6 of the sensor device 1, said RFID transponder 7 may advantageously be configured to emit and receive radio waves at Ultra High Frequencies.

As explained hereinabove, the data relating to the sensor device 1 stored in the memory of the RFID transponder 6 may in particular comprise data enabling the identification of the sensor device 1, such as a unique identification reference.

Likewise, the data relating to the sensor device 1 stored in the memory of the RFID transponder 7 may in particular comprise data enabling the identification of the container 2, like for example a unique identification reference, or else data comprising information on the dimensions, and in particular on the volume, of the enclosure 21 of the container 2.

Thus, as explained hereinabove, the RFID transponder 6 of the sensor device 1 may be intended to allow performing the identification of the sensor device 1, whereas the RDIF transponder 7 of the container 2 may be intended to allow performing the identification of the container 2, each cooperating with an RFID reader, configured to read data enabling the identification of the sensor device 1 stored in the memory of the RFID transponder 6 and/or to read data enabling the identification of the container 2 stored in the memory of the RFID transponder 7.

Advantageously, as said sensor device 1 is fastened on said container 2, the same reader could perform, possibly simultaneously, the reading of the data stored in the memory of the RFID transponder 6 of the sensor device 1 and the data stored in the memory of the RFID transponder 7 of the container 2. For example, such a reader may be installed on a site, in which containers 2 are filled with unstable material M, and in which a sensor device 1 is fastened on said containers 2 after filling thereof with unstable material M.

Advantageously, as explained hereinabove, said RFID transponder 6 of the sensor device 1 may be connected, and in particular by at least one wired connection, to said electronic control means and/or to the data transmitter and/or to the data receiver, as described hereinabove, so as to enable reading and/or writing data in the memory of said RFID transponder 6 by said electronic control means and/or via the data transmitter and/or the data receiver.

This advantageous arrangement facilitates the configuration of the sensor device 1 in order to be able to optimally fulfil its function of determining the level of the material M in the enclosure 21 of the container 2. Indeed, in order to be able to estimate the volume of material M inside the enclosure 21 of the container 2 from the measurement of the level of material M inside the enclosure 21 of the container 2 determined by said level sensor 12, it is necessary to know the dimensions of the enclosure 21 of the container 2. However, there is a wide variety of containers 2 used for the transport of unstable material M, and therefore this information should be communicated to the electronic control means and/or to the data transmitter and/or to the data receiver of the sensor device 1 as soon as the latter is fastened on a new container 2, and preferably in an automated way, and not manually by an operator, because this has many disadvantages.

Thus, after the reader has read the data stored in the memory of the RFID transponder 7 of the container 7 relating to its dimensions as well as those enabling identification thereof, said reader could also communicate them to the RFID transponder 6 of the sensor device 1, which stores them in its memory before communicating them to the electronic control means and/or to the data transmitter and/or to the data receiver, so that the calibration of the sensor device 1, taking into account the information relating to the dimensions of the container 2 on which the sensor device 1 is fastened, could be performed automatically via said electronic control means.

Figures 8, 9:
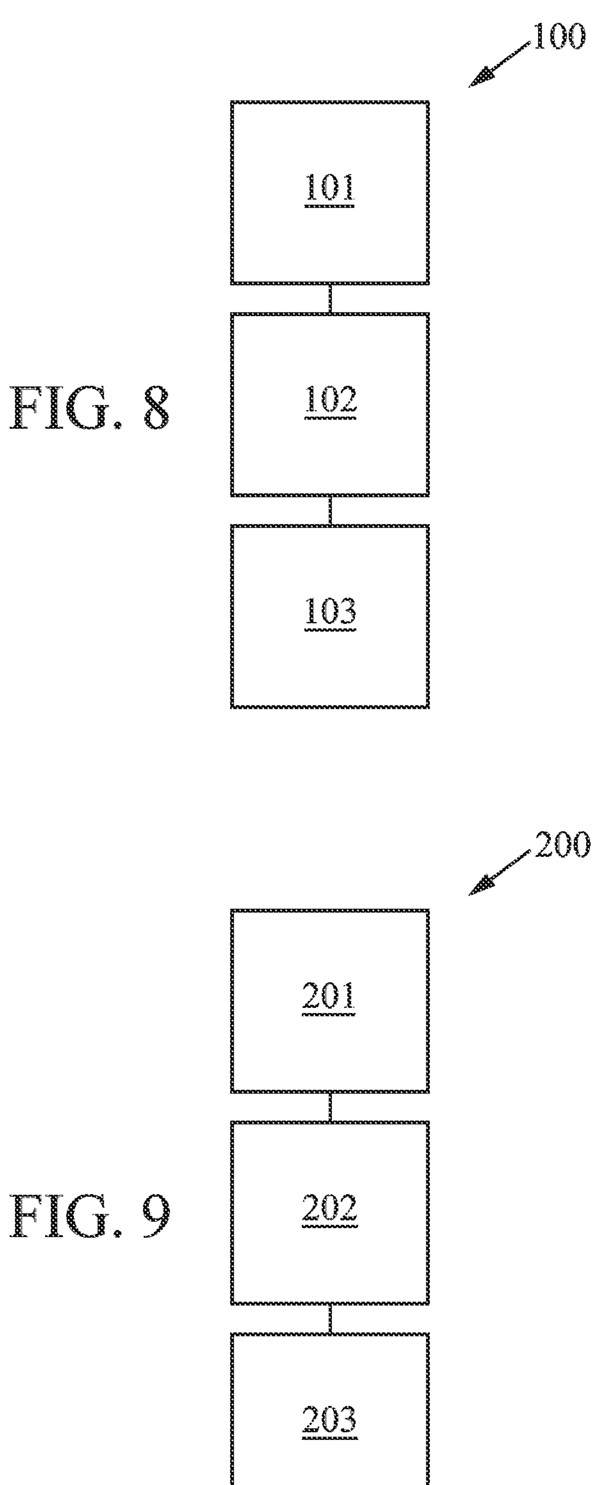
FIG. 8 shows a schematic view of a method for cleaning the inside and/or the outside of the enclosure of a container according to an embodiment in accordance with the invention.
FIG. 9 shows a schematic view of a method for remotely monitoring information relating to a container according to an embodiment in accordance with the invention.

The invention also relates, as represented on the embodiment of FIG. 8, to a method 100 for cleaning the enclosure 21 of a container 2 of a system according to one of the previously-described embodiments comprising:

- the detachment 101 of the sensor device 1 off the connecting means 3,
- the evacuation 102 of the sensor device 1,
- the cleaning 103 of the enclosure 21 at a temperature higher than 60° C.

Cleaning 103 of the enclosure 21 may be carried out at high pressure, i.e. by spraying a cleaning fluid at a pressure higher than 50 bars.

Cleaning 103 of the enclosure 21 may comprise cleaning of the inside and/or the outside of the enclosure 21 of the container 2.

Such a method for cleaning the enclosure 21 of a container 2 is particularly simple and quick to implement with the system according to the invention, because the sensor device 1 can be quickly and simply detached off the connecting means 3 and therefore off the enclosure 21 of the container 2 to proceed with cleaning of the enclosure 21.

In the case where the connecting means 3 is provided removable with respect to the enclosure 21 of the container 2, the latter could also be detached off the enclosure 21 during said cleaning method 100, prior to cleaning of said enclosure 21.

Such a cleaning method according to the invention also avoids any risk of deterioration of the sensor device 1, and in particular of its electronic elements, or else of the connecting means 3, during cleaning, because of the severe conditions during the latter, in particular high temperature, in particular higher than 50° C., or else high pressure, in particular higher than 50 bars, or high pH, in particular higher than 10, and unlike the sensor device of the company Nanolike©, described in part in the patent application WO 2018219683 A1, which cannot be detached, to the least quickly and simply, off the enclosure of the container prior to cleaning thereof.

Cleaning of the enclosure 21 at a temperature higher 60° C. may be carried out with a cleaning liquid, such as high-pressure water.

According to a particular example, the cleaning temperature may be higher than 70° C.

After cleaning of the enclosure 21 of the container 2, and possibly after filling thereof with the material M, the sensor device 1, and possibly the connecting means 3, could be fastened again to said enclosure 21 of the container 2.

The invention also relates, as represented in the embodiment of FIG. 9, to a method 200 for remote monitoring of information relating to a container 2 comprising a sealed enclosure 21 able to contain unstable material M, the unstable material M having characteristics changing over time, using a sensor device 1 according to one of the previously-described embodiments, the method comprising:

- the measurement 201 the level of material M inside the enclosure 21 of the container 2,
- the generation 202 of data representative of the level of material M inside the enclosure 21 of the container 2,
- the transmission 203 of the data representative of the level of material M inside the enclosure 21 of the container 2.

Such a method 200 for remote monitoring of information relating to a container 2 is particularly easy to implement with the sensor device 1 according to the invention. It also facilitates the remote management of the logistics of the container 2, and else advantageously of a fleet including a plurality of containers 2, distributed in different places over a wide geographical area.

Indeed, by remotely monitoring the level of material M inside the enclosure 21 of a container 2, it is possible to anticipate the time point when it will be necessary to organise the repatriation of the empty container 2 and possibly provide for replacement thereof by another container 2 filled with said material M.

According to a particular embodiment, the method 200 according to the invention is used for monitoring a container 2 containing yeast or leaven, and in particular liquid yeast or leaven.

In the case where said sensor device 1 includes a geolocation means 17, the method 200 may also comprise:

- the determination of the geographical position of the container 2,
- the generation of data representative of the geographical position of the container 2,
- the transmission of the data representative of the geographical position of the container 2.

Also, in the case where said sensor device 1 further includes a temperature sensor 18, the method 200 may also comprise:

- the determination of the surrounding temperature of the container 2,
- the generation of data representative of the surrounding temperature of the container 2,
- the transmission of the data representative of the surrounding temperature of the container 2.

The invention also relates to a processing circuit 300 configured to execute a method 200 according to one of the previously-described embodiments.

Figure 10:
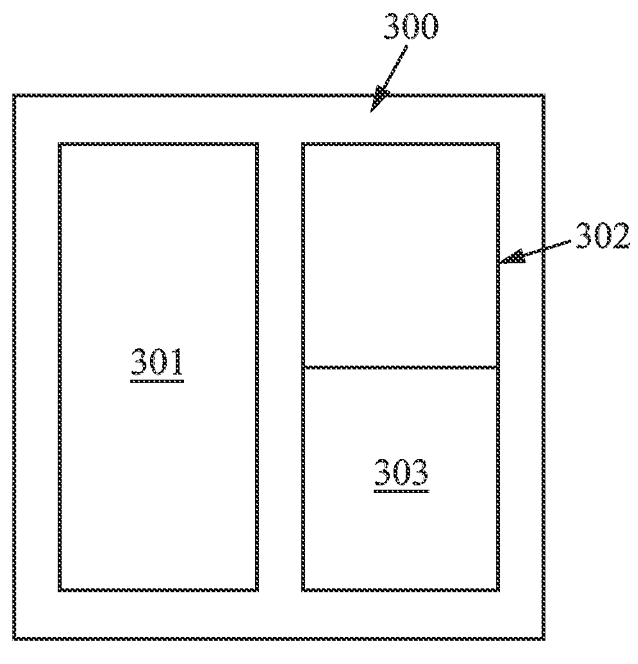
FIG. 10 is a schematic view of a processing circuit according to an embodiment in accordance with the invention.

For example, as shown in the embodiment of FIG. 10, the processing circuit 300 may be:

- a processor 301 able to interpret instructions in computer language, the processor 301 may comprise, or may be associated with a memory unit 302 comprising instructions, or
- the association of a processor 301 and a memory unit 302, the processor 301 capable of being adapted to interpret instructions in computer language, the memory unit 302 comprising said instructions, or,
- a programmable electronic chip such as an FPGA (standing for "Field Arrayable Gate Array") chip.

For example, the processor 301 may be a processor 301, and in particular a microprocessor, of a computer.

The invention also relates to a memory unit 302 readable by a processor 301 comprising instructions 303 which, when executed by the processor 301, cause the latter to implement the method according to one of the previously-described embodiments.

The embodiments of a memory unit 302 readable by a processor 301 include, but are not limited to, computer storage media and communication media, including any medium facilitating the transfer of a computer program from one location to another. By "Computer storage medium(s)", it should be understood any physical medium capable of being accessed by a computer. Examples of computer storage media include, but are not limited to, disks or flash memory components or any other flash memory devices (for example USB drives, memory drives, memory sticks, disk drives), CD-ROMs or other optical data storage devices, DVDs, magnetic disk data storage devices or other magnetic data storage devices, data memory components, RAM, ROM, EEPROM memories, memory cards ("Smart cards"), SSD ("Solid State Drive") type memories, and any other form of media that could be used to transport or store or memorise data or data structures that could be read by a processor 301.

Furthermore, various forms of memory units 302 readable by a processor 301 could transmit or carry instructions towards a processor 301, such as a router, a gateway, a server, or any data transmission equipment, whether this consists of a wired (via a coaxial cable, a fibre optic, telephone wires, a DSL cable, or an Ethernet cable), wireless (via infrared, radio, cellular, microwave) transmission, or virtualised transmission equipment (virtual router, virtual gateway, virtual tunnel end, virtual firewall).

The processing circuit 300, and in particular the memory 302 and/or said processor 301, may be configured to communicate with a means using the RFID technology, and in particular dual-mode RFID technology, in particular in order to enable data transfer to the processing circuit 300 or to the memory 302 cooperating with the processor 301.

Depending on the embodiments, the instructions 303 may comprise code of any computer programming language or computer program element, such as, without limitation, the assembler languages, C, C++, Visual Basic, HyperText Markup Language (HTML), Extensible Markup Language (XML), HyperText Transfer Protocol (HTTP), Hypertext Preprocessor (PHP), SQL, MySQL, Java, JavaScript, JavaScript Object Notation (JSON), Python, and bash scripting.

Of course, other embodiments could have been considered by a person skilled in the art without departing from the scope of the invention defined by the claims hereinafter.

LIST OF THE REFERENCE SIGNS

1. Sensor device
11. Shell
11I. Lower portion
11S. Upper portion
12. Level sensor
P12. Optical separation wall
13. Emitter
S13. Detection signal
R13$_1$ . . . R13$_n$. Emission light ray
O13. Origin
14. Receiver
F14. Planar face
S14. Reflected detection signal
R14$_1$ . . . R14$_n$. Reflected detection light ray
P14$_1$ . . . P14$_n$. Detection unit
M14$_1$ . . . M14$_n$. Measurement signal
Q1. First amount
Q2. Second amount
15. Measurement window
16. Fastening means
T16. Thread
17. Geolocation means
18. Temperature sensor
E19. R19. Lens
2. Container
21. Enclosure
22. Wall
22I. Lower wall
22S. Upper wall
23. Opening
24. Lateral wall
3. Connecting means
31. Tapping
32. Through hole
33. First stop wall
34. Second stop wall
4. User interface
41. Display
42. Light-emitting diode
43. Marking

44. Actuation button
5. Magnetic field measuring means
51. Detection element
6, 7. RFID transponder
SL. Free surface
M. Material
H. Height
300. Processing circuit
301. Processor
302. Memory unit

The invention claimed is:

1. A sensor device for measuring a level of material in a container including a sealed enclosure configured to contain material defining a free surface inside the enclosure, the sensor device comprising:

a shell including a measurement window;

at least one contactless level sensor housed inside the shell, the at least one contactless level sensor comprising an emitter configured to emit a detection signal, and a receiver configured to receive a reflected detection signal comprising the detection signal after reflection, the measurement window of the shell enabling passage of the detection signal emitted by said emitter from the inside of the shell to the inside of the enclosure of the container and the passage of the reflected detection signal, after reflection against the free surface of the material inside the enclosure of the container, from the inside of the enclosure of the container towards said receiver inside the shell; and fastener secured to the shell, the fastener being configured to enable the removable fastening of the sensor device, outside the enclosure of the container, on a connector secured to a wall of the enclosure of the container, with the measurement window of the shell positioned opposite a corresponding opening formed in the wall of the enclosure of the container, wherein the at least one contactless level sensor is configured to emit a measurement signal relating to the level of the material inside the enclosure of the container as a function of the reflected detection signal received by the receiver, the emitter is configured to emit the detection signal including a plurality of emission light rays, at least two emission light rays each having a different orientation with respect to said emitter, the reflected detection signal received by the receiver includes a plurality of reflected detection light rays, each formed by an emission light ray of the detection signal emitted by the emitter after at least one reflection against a wall of the enclosure of the container and/or against the free surface of the material inside the enclosure of the container, the receiver includes a plurality of receiver units evenly distributed over a substantially planar surface directed towards the measurement window, and the receiver units being configured to receive only a single reflected detection ray of the reflected detection signal, the receiver being configured to emit as many measurement signals as receiver units, each determined according to the unique reflected detection ray received at each receiver unit, the measurement signal emitted by said at least one contactless level sensor relating to the level of the material inside the enclosure of the container being determined as a function of the different measurement signals emitted by the receiver determined from the different receiver units.

2. The device according to claim 1, wherein the fastener comprises a thread surrounding said measurement window, the thread being configured to cooperate by screwing/unscrewing with a tapping of the connector, the tapping being configured to surround the opening of the container.

3. The device according to claim 1, further comprising a geolocation system configured to emit a signal allowing determining a geographical position of the sensor device.

4. The device according to claim 1, further comprising a user interface connected to said level sensor, the user interface comprising a display configured to display information relating to the level of material inside the enclosure of the container dependent on the measurement signal emitted by said level sensor, the display comprising a plurality of light-emitting diodes associated with a plurality of markings, the user interface comprising at least one actuation button, connected to the display, the actuation button being configured to trigger a measurement of the level of the material inside the enclosure of the container by the level sensor and the display of information relating to the level of material inside the enclosure of the container.

5. The device according to claim 1, further comprising a data transmitter configured to send data from the at least one contactless level sensor towards a remote server, the data comprising data relating to the level of material inside the enclosure of the container established from the measurement signal emitted by the level sensor.

6. The device according to claim 1, further comprising a temperature sensor configured to measure the temperature surrounding the device.

7. The device according to claim 1, further comprising a magnetic field measurement system configured to emit a measurement signal relating to the magnetic field proximate to said magnetic field measurement system.

8. The device according to claim 1, further comprising an RFID transponder comprising a memory with data relating to the sensor device.

9. The device according to claim 1, wherein:

the emitter is configured to emit an optical detection signal, at least one lens being interposed between the emitter and the measurement window, the receiver is configured to receive an optical reflected detection signal, at least one lens being interposed between the receiver and the measurement window.

10. The device according to claim 1, wherein an optical separation wall separates the emitter from the receiver, said optical separation wall being configured to prevent an optical detection signal emitted by said receiver from reaching said receiver without having crossed said measurement window to come out of the shell.

11. The device according to claim 1, wherein the measurement signal emitted by the level sensor relating to the level of the material inside the enclosure of the container is determined by:

considering a first amount of measurement signals emitted by the receiver determined from a first amount of receiver units, such that each of said measurement signals of said first amount corresponds to a travel time of an emission light ray reflected only by the free surface of the material in the enclosure of the container before forming a reflected detection light ray, considering a second amount of measurement signals emitted by the receiver determined from a second amount of receiver units, such that each of said measurement signals of said second amount corresponds to a travel time of an emission light ray reflected by at least one wall of the enclosure and by the free surface of the material in the enclosure of the container, before and/or after having been reflected by said wall of the enclosure, before forming a reflected detection light ray, and strictly longer than the travel time corresponding to the measurement signals of the first amount, and discriminating the measurement signals of the second amount of measurement signals and taking into account only the measurement signals of the first amount of measurement signals to determine the measurement signal emitted by the level sensor.

12. A set comprising:

a connector configured to be secured to a wall of a sealed enclosure of a container; and a sensor device configured to measure a level of material in the container including the sealed enclosure configured to contain material defining a free surface inside the enclosure, the sensor device comprising:

a shell including a measurement window, at least one contactless level sensor housed inside the shell, the at least one contactless level sensor comprising an emitter configured to emit a detection signal, and a receiver configured to receive a reflected detection signal comprising the detection signal after reflection, the measurement window of the shell enabling passage of the detection signal emitted by said emitter from the inside of the shell to the inside of the enclosure of the container and the passage of the reflected detection signal, after reflection against the free surface of the material inside the enclosure of the container, from the inside of the enclosure of the container towards said receiver inside the shell, and a fastener secured to the shell, the fastener being configured to enable the removable fastening of the sensor device, outside the enclosure of the container, on a connector secured to a wall of the enclosure of the container, with the measurement window of the shell positioned opposite a corresponding opening formed in the wall of the enclosure of the container, the at least one contactless level sensor being configured to emit a measurement signal relating to the level of the material inside the enclosure of the container as a function of the reflected detection signal received by the receiver; and wherein the connector has a through hole configured to be positioned opposite and in line with an opening formed in said wall of the enclosure of the container, and wherein the sensor device is configured to be removably fastened on the connector via the fastener with the measurement window of the shell opposite and in line with the through hole of the connector and the opening formed in the wall of the enclosure of the container, said through hole being configured to be crossed by the detection signal emitted by the emitter and by the reflected detection signal intended to be received by the receiver.

13. The set according to claim 12, wherein:

the fastener of the sensor device comprises a thread surrounding the measurement window of the shell of the sensor device, and the connector includes a tapping surrounding said through hole, the tapping being configured to surround the opening formed in the wall of the enclosure of the container, the tapping being configured to cooperate with said thread of the fastener to ensure the removable fastening of the sensor device on said connector by screwing/unscrewing.

14. A set comprising:

a connector configured to be secured to a wall of a sealed enclosure of a container; and a sensor device configured to measure a level of material in the container including the sealed enclosure configured to contain material defining a free surface inside the enclosure, the sensor device comprising:

a shell including a measurement window, at least one contactless level sensor housed inside the shell, the at least one contactless level sensor comprising an emitter configured to emit a detection signal, and a receiver configured to receive a reflected detection signal comprising the detection signal after reflection, the measurement window of the shell enabling passage of the detection signal emitted by said emitter from the inside of the shell to the inside of the enclosure of the container and the passage of the reflected detection signal, after reflection against the free surface of the material inside the enclosure of the container, from the inside of the enclosure of the container towards said receiver inside the shell, a fastener secured to the shell, the fastener being configured to enable the removable fastening of the sensor device, outside the enclosure of the container, on a connector secured to a wall of the enclosure of the container, with the measurement window of the shell positioned opposite a corresponding opening formed in the wall of the enclosure of the container, and a magnetic field measurement system configured to emit a measurement signal relating to the magnetic field proximate to said magnetic field measurement system, wherein the at least one contactless level sensor is configured to emit a measurement signal relating to the level of the material inside the enclosure of the container as a function of the reflected detection signal received by the receiver, wherein the connector has a through hole configured to be positioned opposite and in line with an opening formed in said wall of the enclosure of the container, wherein the sensor device is configured to be removably fastened on the connector via the fastener with the measurement window of the shell opposite and in line with the through hole of the connector and of the opening formed in the wall of the enclosure of the container, said through hole being configured to be crossed by the detection signal emitted by the emitter and by the reflected detection signal configured to be received by the receiver, wherein the connector includes a detection element made, at least partially, of a magnetic material, configured to emit a magnetic field able to be measured by said magnetic field measurement system of the sensor device when said sensor device is fastened to said connector.

15. A system comprising:

the set according to claim 12; and the container including a-the sealed enclosure, the enclosure comprising the wall, the enclosure being configured to contain material therein, an opening being formed in the wall of the enclosure, the opening being configured to connect the inside and the outside of the enclosure, wherein the connector is secured to the wall of the enclosure with the through hole opposite and in line with of the opening of the container, and wherein the sensor device is removably fastened to the connector with the measurement window in line with the through hole of the connector and the opening of the container, so that the emitter of the level sensor is configured to emit the detection signal towards the inside of the enclosure of the container and the receiver of the level sensor is configured to receive said reflected detection signal, after reflection against the free surface of the material inside the enclosure of the container.

16. The system according to claim 15, wherein the sensor device further comprises an RFID transponder comprising a memory with data relating to the sensor device, and wherein an RFID transponder comprising a storage memory with data relating to the container is fastened on the enclosure of the container.

17. A method for configuring the sensor device belonging to the system according to claim 16, the method being implemented by the system, the method comprising:

interrogating the RFID transponder attached to the enclosure of the container to obtain information relating to the container by reading the memory of the RFID transponder attached to the enclosure of the container;

receiving, by the RFID transponder of said sensor device, the information relating to the container to store the information in the memory of said RFID transponder of said sensor device; and transmitting, by at least one wired connection, the information relating to the container which is stored in the memory of said RFID transponder to one or more of the electronic controller, the data transmitter, and the data receiver of said sensor device.

18. The method according to claim 17, wherein an RFID reader is used to interrogate the RFID transponder attached to the enclosure of the container to retrieve information relating to the container, and is used to communicate said information relating to the container to the RFID transponder of said sensor device.

19. The method according to claim 17, wherein the information relating to the container is chosen from one or more of a unique identification reference identifying said container, a volume, and at least one dimension of said container.

20. A method for remote monitoring of information relating to a container including a sealed enclosure configured to contain unstable material having characteristics changing over time, using a sensor device configured to measure a level of material in the container including the sealed enclosure configured to contain material defining a free surface inside the enclosure, the sensor device including:

a shell including a measurement window, at least one contactless level sensor housed inside the shell, the at least one contactless level sensor comprising an emitter configured to emit a detection signal, and a receiver configured to receive a reflected detection signal comprising the detection signal after reflection, the measurement window of the shell enabling passage of the detection signal emitted by said emitter from the inside of the shell to the inside of the enclosure of the container and the passage of the reflected detection signal, after reflection against the free surface of the material inside the enclosure of the container, from the inside of the enclosure of the container towards said receiver inside the shell, and a fastener secured to the shell, the fastener being configured to enable the removable fastening of the sensor device, outside the enclosure of the container, on a connector secured to a wall of the enclosure of the container, with the measurement window of the shell positioned opposite a corresponding opening formed in the wall of the enclosure of the container, the at least one contactless level sensor being configured to emit a measurement signal relating to the level of the material inside the enclosure of the container as a function of the reflected detection signal received by the receiver, the method comprising:

measuring the level of material inside the enclosure of the container;

generating data representative of the level of material inside the enclosure of the container; and transmitting the data representative of the level of material inside the enclosure of the container.

21. A processing circuit configured to execute the method according to claim 17.

22. A non-transitory computer-readable medium on which are stored instructions which, when executed by the computer, cause the computer to implement the method according to claim 17.

* * * * *